United States Patent
Kawamoto et al.

(10) Patent No.: US 12,094,151 B2
(45) Date of Patent: Sep. 17, 2024

(54) IMAGE PROCESSING SYSTEM, IMAGE PROCESSING METHOD, LEARNED MODEL GENERATION METHOD, AND DATA SET FOR LEARNING

(71) Applicant: Komatsu Ltd., Tokyo (JP)

(72) Inventors: Shun Kawamoto, Tokyo (JP); Shintaro Hamada, Tokyo (JP); Yosuke Kajihara, Tokyo (JP)

(73) Assignee: Komatsu Ltd., Tokyo (JP)

( * ) Notice: Subject to any disclaimer, the term of this patent is extended or adjusted under 35 U.S.C. 154(b) by 411 days.

(21) Appl. No.: 17/422,029

(22) PCT Filed: Jan. 24, 2020

(86) PCT No.: PCT/JP2020/002554
§ 371 (c)(1),
(2) Date: Jul. 9, 2021

(87) PCT Pub. No.: WO2020/158611
PCT Pub. Date: Aug. 6, 2020

(65) Prior Publication Data
US 2022/0101552 A1 Mar. 31, 2022

(30) Foreign Application Priority Data
Feb. 1, 2019 (JP) .................. 2019-017400

(51) Int. Cl.
*G06T 7/70* (2017.01)
*G06T 7/11* (2017.01)
*G06T 17/00* (2006.01)

(52) U.S. Cl.
CPC .................. *G06T 7/70* (2017.01); *G06T 7/11* (2017.01); *G06T 17/00* (2013.01); *G06T 2207/20081* (2013.01); *G06T 2207/20084* (2013.01)

(58) Field of Classification Search
CPC ... G06T 7/70; G06T 7/11; G06T 17/00; G06T 2207/20081; G06T 2207/20084;
(Continued)

(56) References Cited

U.S. PATENT DOCUMENTS
2009/0304271 A1 12/2009 Takahashi
2014/0184643 A1* 7/2014 Friend ............... G09G 3/003
345/633
(Continued)

FOREIGN PATENT DOCUMENTS
JP A-11-211438 8/1999
JP A-2000-192514 7/2000
(Continued)

OTHER PUBLICATIONS

Rosebrock, "Semantic segmentation with OpenCV and deep learning," Sep. 3, 2018, retrieved from URL <https://pyimagesearch.com/2018/09/03/semantic-segmentation-with-opencv-and-deep-learning/>, 31 pages.

*Primary Examiner* — Nimesh Patel
(74) *Attorney, Agent, or Firm* — Fish & Richardson P.C.

(57) ABSTRACT

In the image processing system according to the present invention, the data acquisition unit acquires a captured image showing a loading/unloading target of a transporting material of a work machine. The area-specifying unit specifies an area including the loading/unloading target from the captured image. The loading/unloading target-specifying unit specifies at least one predetermined surface of the loading/unloading target from the area including the loading/unloading target.

7 Claims, 15 Drawing Sheets

(58) Field of Classification Search
CPC .. G06T 7/50; G06T 7/62; G06T 17/20; G06T 2207/10016; G06T 2207/10024; G06T 7/0004; G06T 2207/10004; G06T 7/20; G06T 2207/30252; G06T 2207/10021; G06T 2207/30242; G06T 7/593; G06T 2207/10048; G06T 7/00; G06T 1/0007; G06T 2207/10012; G06T 2207/10032; G06N 20/00; G06N 3/045; G06N 3/08; G06N 3/044; G06N 3/088; G06V 10/10; G06V 20/52; G06V 10/82; G06V 10/255; G06V 10/443; G06V 10/764; G06V 10/25; G06V 20/698; G06V 40/10; G06V 20/584; G06V 20/58; G06V 20/56; G06V 2201/06

See application file for complete search history.

(56) References Cited

U.S. PATENT DOCUMENTS

| | | | |
|---|---|---|---|
| 2015/0352994 A1* | 12/2015 | Mochizuki | B60G 17/017 298/22 C |
| 2017/0089042 A1* | 3/2017 | Machida | H04N 7/181 |
| 2017/0120823 A1* | 5/2017 | Mitsuta | H04N 23/698 |
| 2017/0328032 A1 | 11/2017 | Matsuo et al. | |
| 2018/0068564 A1 | 3/2018 | Tanigawa et al. | |
| 2018/0285698 A1 | 10/2018 | Yamada | |
| 2019/0026914 A1* | 1/2019 | Hageman | G01B 11/26 |
| 2019/0048560 A1* | 2/2019 | Misaki | E02F 9/261 |
| 2020/0111215 A1* | 4/2020 | Horikawa | G06V 20/36 |

FOREIGN PATENT DOCUMENTS

| | | |
|---|---|---|
| JP | A-2018-041176 | 3/2018 |
| JP | 2018146347 A | 9/2018 |
| JP | 2018-173814 A | 11/2018 |
| JP | 2019016294 A | 1/2019 |
| WO | 2008018398 A1 | 2/2008 |
| WO | WO 2017/042873 A1 | 3/2017 |
| WO | WO 2019/016870 | 1/2019 |

* cited by examiner

IMAGE PROCESSING SYSTEM, IMAGE PROCESSING METHOD, LEARNED MODEL GENERATION METHOD, AND DATA SET FOR LEARNING

CROSS-REFERENCE TO RELATED APPLICATIONS

This application is a National Stage application under 35 U.S.C. § 371 of International Application No. PCT/JP2020/002554, filed on Jan. 24, 2020, which claims priority to Japanese Patent Application No. 2019-017400, filed on Feb. 1, 2019. The contents of the prior applications are incorporated herein in their entirety.

TECHNICAL FIELD

The present invention relates to an image processing system, an image processing method, a learned model generation method, and a data set for learning.

BACKGROUND ART

Patent Document 1 discloses a technique of extracting an edge from an image captured by an image-capturing device provided in a hydraulic excavator to specify a position of a dump body of a dump truck.

CITATION LIST

Patent Document

Patent Document 1
Japanese Unexamined Patent Application, First Publication No. 2000-192514

SUMMARY OF INVENTION

Technical Problem

At a site where a loading machine is present, a road may not be paved and a rut is generated on the ground surface. When an edge is extracted from an image showing the rut and the dump truck, an edge of the rut is also generated in addition to an edge of the dump truck. Therefore, in a case where the dump body position of the dump truck is specified from the captured image by the technique described in Patent Document 1, there is a possibility that the position of the dump body cannot be properly specified due to the presence of the rut. An object of the present invention is to provide an image processing system, an image processing method, a learned model generation method, and a data set for learning capable of improving robustness of processing of specifying a loading/unloading target of a transporting material from a captured image.

Solution to Problem

According to one aspect of the present invention, an image processing system includes a data acquisition unit configured to acquire a captured image showing a loading/unloading target of a transporting material of a work machine, an area-specifying unit configured to specify an area including the loading/unloading target from the captured image, and a loading/unloading target-specifying unit configured to specify at least one predetermined surface of the loading/unloading target from the area including the loading/unloading target.

Advantageous Effects of Invention

According to the above aspect, the image processing system can improve the robustness of the processing of specifying the loading/unloading target.

DETAILED DESCRIPTION OF EMBODIMENTS

First Embodiment

Hereinafter, embodiments will be described in detail with reference to drawings.

Figure 1:
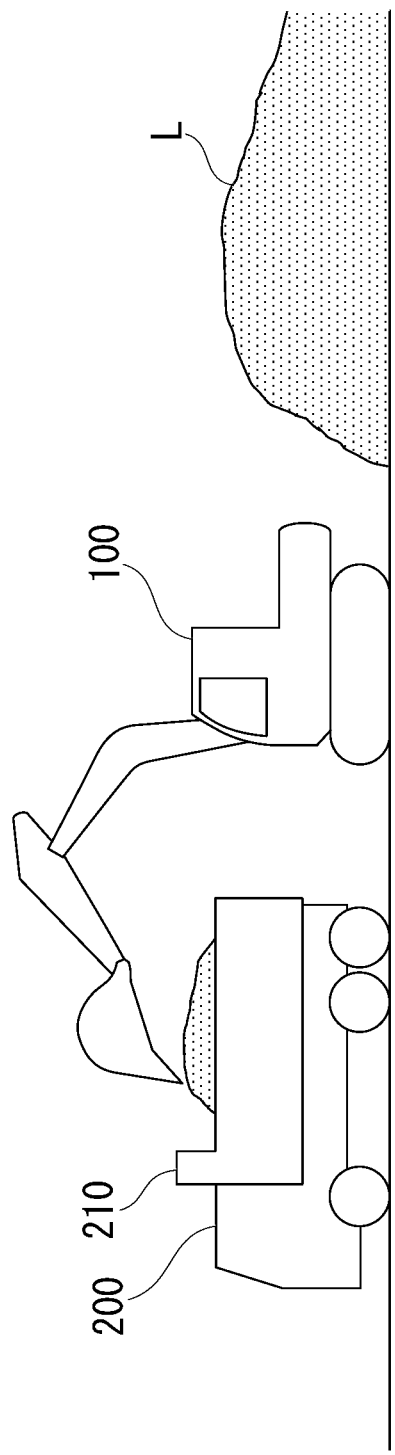
FIG. 1 is a diagram showing a configuration of a loading site according to one embodiment.

FIG. 1 is a diagram showing a configuration of a loading site according to one embodiment.

At the loading site, a hydraulic excavator 100 which is a loading machine and a dump truck 200 which is a carrying vehicle are deployed. The hydraulic excavator 100 scoops a transporting material L such as earth from a construction site and loads the transporting material on the dump truck 200. The dump truck 200 transports the transporting material L loaded by the hydraulic excavator 100 to a predetermined dump site. The dump truck 200 includes a dump body 210, which is a container for accommodating the transporting material L. The dump body 210 is an example of a loading/unloading target of the transporting material L. The loading site is an example of a site. The site is land where the loading machine is operated.

<<Configuration of Hydraulic Excavator>>

Figure 2:
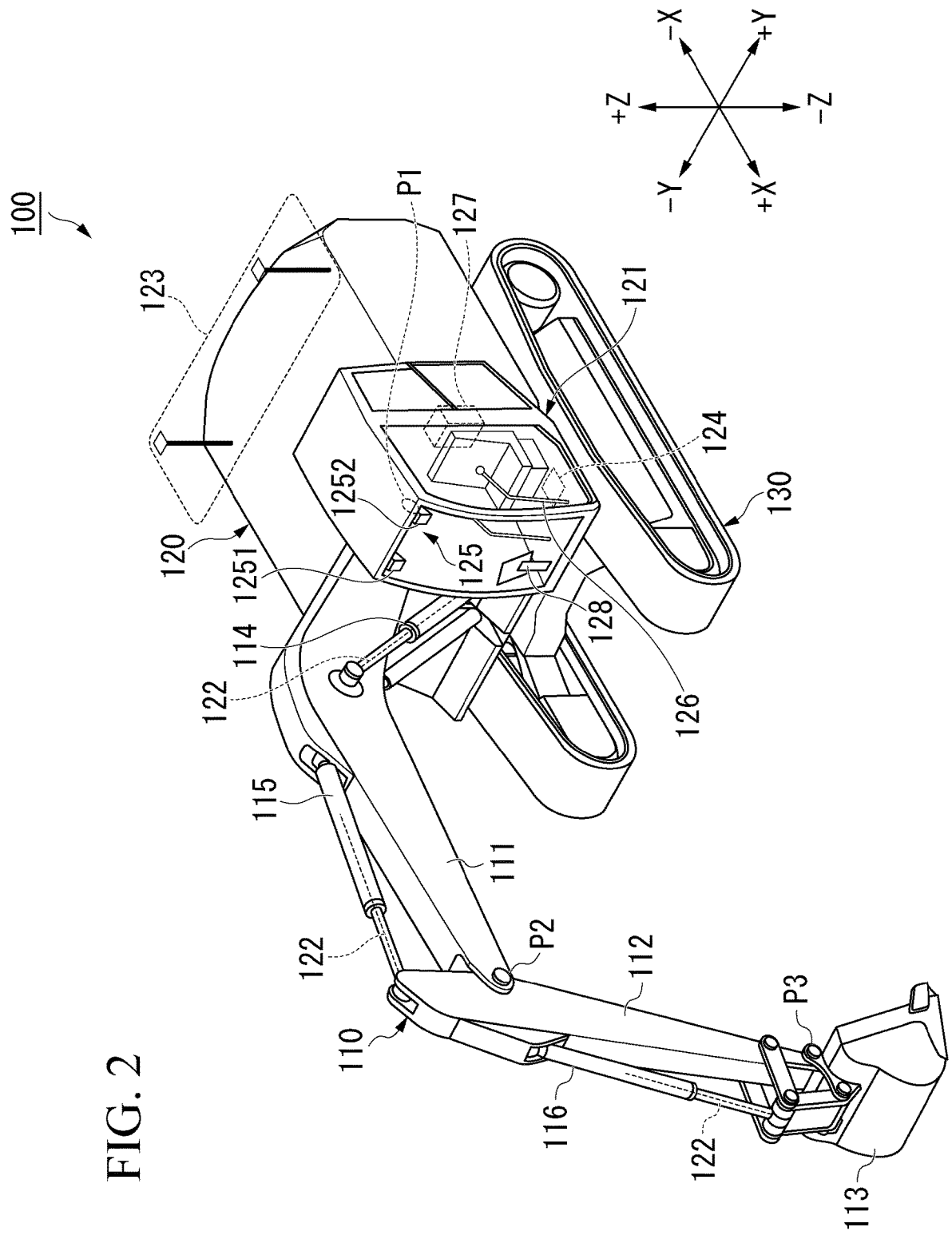
FIG. 2 is an external view of a hydraulic excavator according to one embodiment.

FIG. 2 is an external view of a hydraulic excavator according to one embodiment.

The hydraulic excavator 100 includes work equipment 110 that is hydraulically operated, a swing body 120 that supports the work equipment 110, and an undercarriage 130 that supports the swing body 120.

The work equipment 110 includes a boom 111, an arm 112, a bucket 113, a boom cylinder 114, an arm cylinder 115, and a bucket cylinder 116.

The boom 111 is a column that supports the arm 112 and the bucket 113. A base end portion of the boom 111 is attached to a front portion of the swing body 120 through a boom pin P1.

The arm 112 connects the boom 111 and the bucket 113. A base end portion of the arm 112 is attached to a tip end portion of the boom 111 through an arm pin P2.

The bucket 113 is a container having a blade for excavating earth or the like. A base end portion of the bucket 113 is attached to a tip end portion of the arm 112 through a bucket pin P3.

The boom cylinder 114 is a hydraulic cylinder for operating the boom 111. A base end portion of the boom cylinder 114 is attached to the swing body 120. A tip end portion of the boom cylinder 114 is attached to the boom 111.

The arm cylinder 115 is a hydraulic cylinder for driving the arm 112. A base end portion of the arm cylinder 115 is attached to the boom 111. A tip end portion of the arm cylinder 115 is attached to the arm 112.

The bucket cylinder 116 is a hydraulic cylinder for driving the bucket 113. A base end portion of the bucket cylinder 116 is attached to the arm 112. A tip end portion of the bucket cylinder 116 is attached to the bucket 113.

The swing body 120 is provided with a cab 121 in which an operator rides. The cab 121 is provided in front of the swing body 120 and on a left-side (+Y side) of the work equipment 110.

<<Control System of Hydraulic Excavator>>

The hydraulic excavator 100 includes a work equipment position detector 122, a position azimuth direction calculator 123, an inclination detector 124, a stereo camera 125, an operation device 126, a control device 127, and a display device 128.

The work equipment position detector 122 detects an angle of the work equipment 110. The work equipment position detector 122 according to a first embodiment is a stroke detector that detects a stroke length of each of the boom cylinder 114, the arm cylinder 115, and the bucket cylinder 116. Accordingly, the control device 127 described below can detect the angle of the work equipment 110 based on the stroke length of each of the boom cylinder 114, the arm cylinder 115, and the bucket cylinder 116. On the other hand, the present invention is not limited thereto in another embodiment. An angle detector such as an IMU, a rotary encoder, or a level may be used as the work equipment position detector 122, instead of the stroke detector or in combination with the stroke detector.

The position azimuth direction calculator 123 calculates a position of the swing body 120 and an azimuth direction in which the swing body 120 faces. The position azimuth direction calculator 123 includes two receivers that receive positioning signals from artificial satellites configuring a global navigation satellite system (GNSS). Each of the two receivers is installed at a different position of the swing body 120. The position azimuth direction calculator 123 detects a position of a representative point (origin of a vehicle body coordinate system) of the swing body 120 in a site coordinate system based on the positioning signal received by at least one receiver.

The position azimuth direction calculator 123 calculates the azimuth direction of the swing body 120 based on positions indicated by the two detected positioning signals and grounding positions of the two receivers, using each of the positioning signals received by the two receivers. The position azimuth direction calculator 123 according to another embodiment may include another device such as a rotary encoder or an IMU, instead of the two receivers to measure the azimuth direction of the swing body 120.

The inclination detector 124 measures acceleration and angular velocity of the swing body 120 to detect an inclination of the swing body 120 (for example, a roll representing rotation with respect to the X-axis, a pitch representing rotation with respect to the Y-axis, and a yaw representing rotation with respect to the Z-axis) based on the measurement result. The inclination detector 124 is installed, for example, on a lower surface of the cab 121. For example, an inertial measurement unit (IMU) which is an inertial measurement device can be used as the inclination detector 124.

The stereo camera 125 is provided on an upper portion of the cab 121. The stereo camera 125 is installed in front (+X direction) of and above (+Z direction) the cab 121. The stereo camera 125 captures an image in front (+X direction) of the cab 121 through a windshield on a front surface of the cab 121. The stereo camera 125 includes at least one pair of cameras.

The operation device 126 is provided inside the cab 121. The operation device 126 is operated by the operator to supply hydraulic oil to an actuator of the work equipment 110.

The hydraulic oil is supplied to the boom cylinder 114, the arm cylinder 115, the bucket cylinder 116, and a swing motor (not shown) according to an operation amount of the operation device 126, and the work equipment 110 and the swing body 120 are driven.

The control device 127 acquires information from the work equipment position detector 122, the position azimuth direction calculator 123, the inclination detector 124, and the stereo camera 125 to generate guidance information indicating a positional relationship between the bucket 113 and the dump body of the dump truck 200.

The display device 128 displays the guidance information generated by the control device 127.

Depending on the embodiment, the hydraulic excavator 100 may not include the work equipment position detector 122, the position azimuth direction calculator 123, the inclination detector 124, the stereo camera 125, and the display device 128.

<<Configuration of Stereo Camera>>

In the first embodiment, the stereo camera 125 includes a right-side camera 1251 and a left-side camera 1252. Cameras using a charge-coupled device (CCD) sensor and a complementary metal-oxide-semiconductor (CMOS) sensor are exemplary examples of each camera.

The right-side camera 1251 and the left-side camera 1252 are installed at an interval in a left-right direction (Y-axis direction) such that optical axes of the cameras are substantially parallel to a floor surface of the cab 121. The stereo camera 125 is an example of an image-capturing device. The control device 127 can calculate a distance between the stereo camera 125 and a captured target by using an image captured by the right-side camera 1251 and an image captured by the left-side camera 1252. Hereinafter, the image captured by the right-side camera 1251 is also referred to as a right-eye image. The image captured by the left-side camera 1252 is also referred to as a left-eye image. A combination of the images captured by both cameras of the stereo camera 125 is also referred to as a stereo image. In another embodiment, the stereo camera 125 may be configured of three or more cameras.

<<Configuration of Control Device>>

Figure 3:
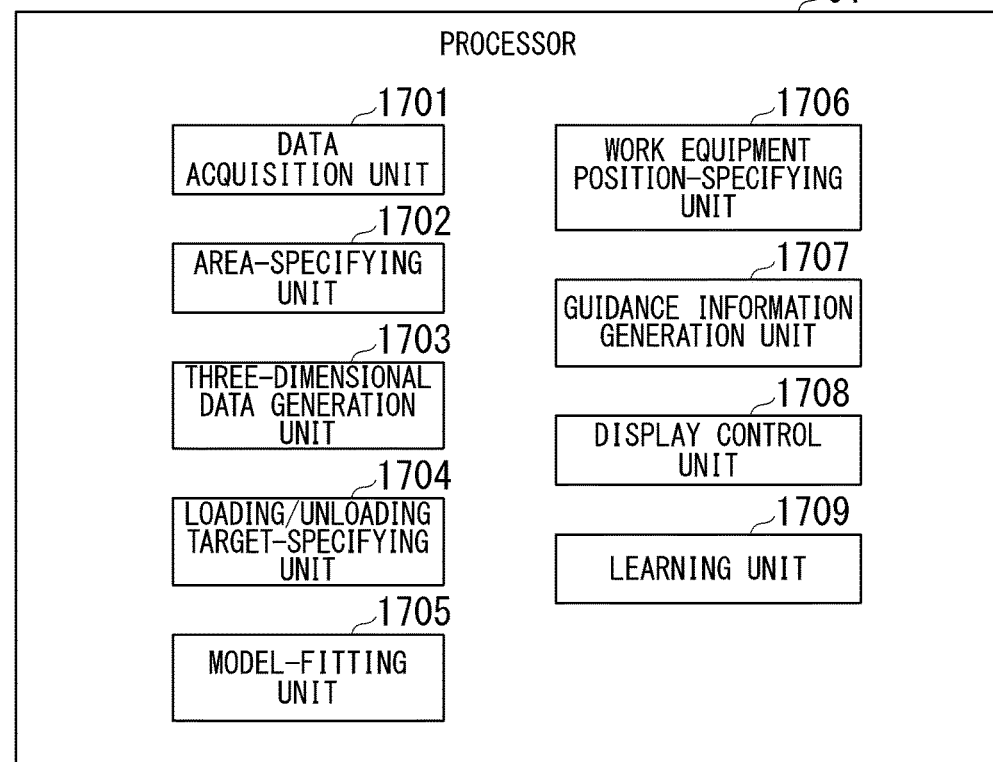
FIG. 3 is a schematic block diagram showing a configuration of a control device according to a first embodiment.

FIG. 3 is a schematic block diagram showing a configuration of the control device according to the first embodiment.

The control device 127 includes a processor 91, a main memory 92, a storage 93, and an interface 94.

A program for controlling the work equipment 110 is stored in the storage 93. A hard disk drive (HDD) and a non-volatile memory are exemplary examples of the storage 93. The storage 93 may be an internal medium directly connected to a bus of the control device 127 or an external medium connected to the control device 127 through the interface 94 or a communication line. The storage 93 is an example of a storage unit.

The processor 91 reads the program from the storage 93, expands the program into the main memory 92, and executes processing according to the program. The processor 91 secures a storage area in the main memory 92 according to the program. The main memory 92 is an example of the storage unit. The interface 94 is connected to the work equipment position detector 122, the position azimuth direction calculator 123, the inclination detector 124, the stereo camera 125, the display device 128, and another peripheral device to transmit and receive signals.

The control device 127 according to the first embodiment displays the guidance information representing a relative position between the work machine and the loading/unloading target of the transporting material on the display device 128. Accordingly, the operator can recognize the loading/unloading target by referring to the guidance information even in a case where it is difficult to visually recognize the loading/unloading target.

Therefore, by running the program, the processor 91 is provided with a data acquisition unit 1701, an area-specifying unit 1702, a three-dimensional data generation unit 1703, a loading/unloading target-specifying unit 1704, a model-fitting unit 1705, a work equipment position-specifying unit 1706, a guidance information generation unit 1707, a display control unit 1708, and a learning unit 1709. The storage 93 stores a camera parameter CP, a segmentation model M, and a target model D. The camera parameter CP is information indicating a positional relationship between the swing body 120 and the right-side camera 1251 and a positional relationship between the swing body 120 and the left-side camera 1252. The target model D is three-dimensional data representing a shape of the dump body 210.

The program may be for realizing some of the functions exerted by the control device 127. For example, the program may exert the function by a combination with another program already stored in the storage 93 or a combination with another program installed in another device. In another embodiment, the control device 127 may include a custom large-scale integrated circuit (LSI) such as a programmable logic device (PLD) in addition to or instead of the above configuration. A programmable array logic (PAL), a generic array logic (GAL), a complex programmable logic device (CPLD), and a field-programmable gate array (FPGA) are exemplary examples of the PLD. In this case, some or all of the functions realized by the processor may be realized by the integrated circuit.

The data acquisition unit 1701 acquires data from the work equipment position detector 122, the position azimuth direction calculator 123, the inclination detector 124, and the stereo camera 125 through the interface 94. That is, the data acquisition unit 1701 acquires the angle of the work equipment 110, a position, azimuth direction, and inclination of the swing body 120, and the stereo image. The data acquisition unit 1701 is an example of an image acquisition unit. Hereinafter, the position, azimuth direction, and inclination of the swing body 120 are also referred to as a posture of the swing body 120. Since the stereo camera 125 is provided on the swing body 120, the position, azimuth direction, and inclination of the swing body 120 represent a posture of the stereo camera 125.

Figure 4:
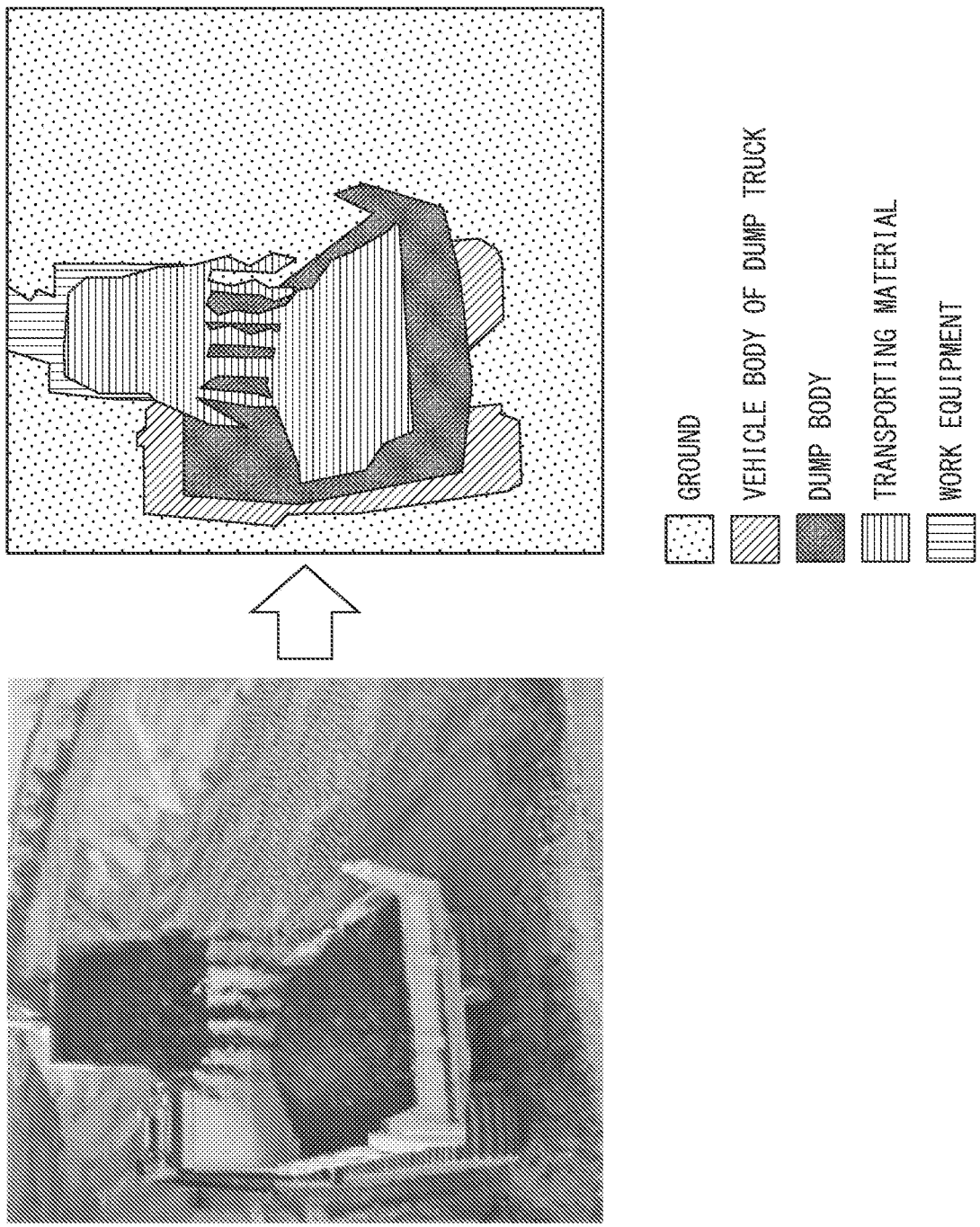
FIG. 4 is a diagram showing an example of image segmentation according to the first embodiment.

FIG. 4 is a diagram showing an example of image segmentation according to the first embodiment.

The area-specifying unit 1702 inputs the right-eye image of the stereo image acquired by the data acquisition unit 1701 into the segmentation model M stored in the storage 93 to divide the right-eye image into a plurality of areas corresponding to a plurality of known objects. For example, as shown in FIG. 4, the area-specifying unit 1702 generates a segment image in which the right-eye image which is an input image is divided into the plurality of areas corresponding to five objects of a vehicle body of the dump truck 200, the dump body 210, the transporting material L, the work equipment 110, and the ground. The plurality of known objects include at least the dump body 210 which is a loading target. A value of each pixel of the segment image takes a value representing a type of the object shown in the pixel of the input image corresponding to the pixel. That is, the segment image is divided into the plurality of areas (segments) formed of a plurality of pixels having the same value. The area-specifying unit 1702 specifies an area in which the dump body is shown in the stereo image acquired by the data acquisition unit 1701 based on the segment image of the segmentation model M.

Figure 5:
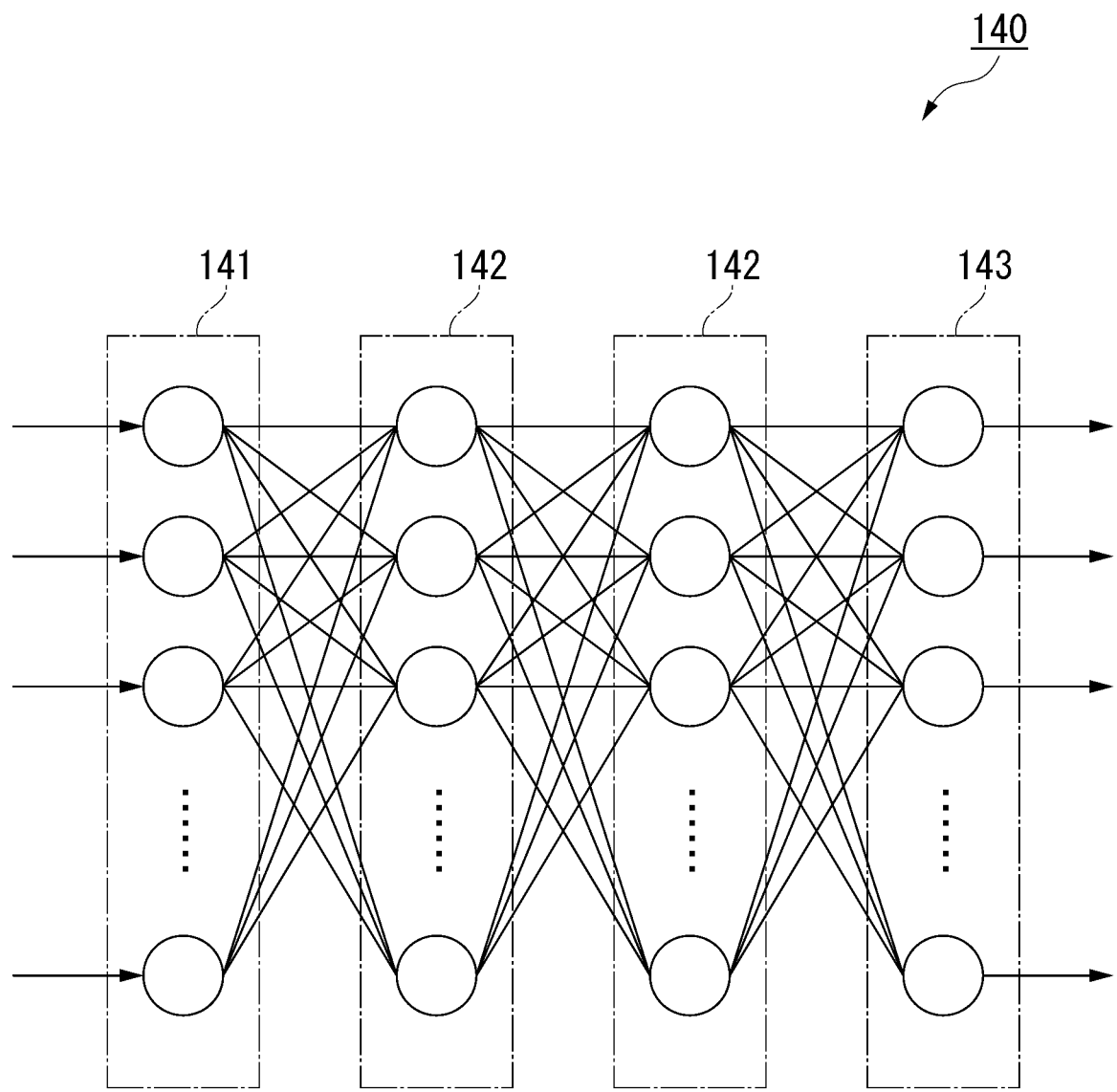
FIG. 5 is a diagram showing an example of a configuration of a neural network.

The segmentation model M includes a neural network 140 shown in FIG. 5. FIG. 5 is a diagram showing an example of a configuration of a neural network. The segmentation model M is realized by, for example, a learned model of a deep neural network (DNN). The learned model is configured of a combination of a learning model and a learned parameter. As shown in FIG. 5, the neural network 140 includes an input layer 141, one or more intermediate layers 142 (hidden layers), and an output layer 143. Each of the layers 141, 142, and 143 includes one or more neurons. The number of neurons in the intermediate layer 142 can be set as appropriate. The output layer 143 can be set as appropriate according to a size of an output image.

Neurons in layers adjacent to each other are coupled to each other, and a weight (coupling load) is set for each coupling. The number of coupled neurons may be set as appropriate. A threshold value is set for each neuron. An output value of each neuron is determined by whether or not a sum of products of an input value and the weight for each neuron exceeds the threshold value.

An image is input to the input layer 141. The image input to the input layer 141 is an image showing an object corresponding to at least one of a plurality of areas (a plurality of objects). In the output layer 143, a segment image in which a value of each pixel takes a value representing a type of an object that is shown in a corresponding pixel of the image input to the input layer 141 and corresponds to the pixel is input. That is, the segmentation model M is a learned model trained to output a segment image divided into areas for each object shown in an image when the image is input.

For example, the segmentation model M is trained by using a data set for learning in which the image captured at the loading site is used as learning data and the segment image in which the pixel value is divided for each of the vehicle body of the dump truck 200, the dump body 210, the transporting material L, the work equipment 110, and the ground is used as supervised data. In the present embodiment, the "learning data" refers to data input to the input layer during the training of the learning model. In the present embodiment, the "supervised data" is data which is a correct answer for comparison with the value of the output layer of the neural network 140. In the present embodiment, the "data set for learning" refers to a combination of the learning data and the supervised data.

The learned parameter of the segmentation model M obtained by learning is stored in the storage 93. The learned parameter includes, for example, the number of layers of the neural network 140, the number of neurons in each layer, a coupling relationship between the neurons, the weight of the coupling between the neurons, and the threshold value of each neuron.

A DNN configuration generally used for image segmentation is used as the configuration of the neural network 140 of the segmentation model M. The segmentation model M may be a transfer-learned version of an existing learned segmentation model using the above data set for learning. The segmentation model M according to another embodiment may be trained by unsupervised learning or reinforcement learning.

The three-dimensional data generation unit 1703 extracts, based on an area in which the dump body 210 specified by the area-specifying unit 1702 is shown, a partial right-eye image and a partial left-eye image configured of pixels related to the area from each of the right-eye image and the left-eye image of the stereo image. The three-dimensional data generation unit 1703 may extract the partial right-eye image and the partial left-eye image not only from the area classified as the dump body 210 but also from an area including the vicinity of the area classified into the dump body 210. For example, the three-dimensional data generation unit 1703 may extract an area in which a rectangle circumscribing the area classified as the dump body 210 is expanded vertically and horizontally by a predetermined number of pixels as the partial right-eye image and the partial left-eye image. By extracting the area including the vicinity of the area classified as the dump body 210, it is possible to prevent the area in which the dump body 210 is shown from being missing even in a case where a part of the dump body is classified as another object due to a segmentation error.

The three-dimensional data generation unit 1703 generates point group data indicating a position of the area in which the dump body 210 is shown in the site coordinate system based on the partial right-eye image and the partial left-eye image, the camera parameter CP stored in the storage 93, and the position, azimuth direction, and inclination of the swing body 120 acquired by the data acquisition unit 1701. Specifically, the three-dimensional data generation unit 1703 generates the point group data by the following method. First, the three-dimensional data generation unit 1703 generates the point group data related to the vehicle body coordinate system by triangulation based on the partial right-eye image, the partial left-eye image, and the camera parameter CP. Next, the three-dimensional data generation unit 1703 converts a position of each point in the vehicle body coordinate system into the position of each point in the site coordinate system based on the position, azimuth direction, and inclination of the swing body 120. The point group data is an example of three-dimensional data representing a three-dimensional shape of the subject of the captured image. In another embodiment, a depth image, a polygon, a CAD model, and the like may be used as the three-dimensional data.

The loading/unloading target-specifying unit 1704 specifies a three-dimensional feature amount (3D point group feature amount) for each point of the point group data generated by the three-dimensional data generation unit 1703. A normal feature, a signature of histograms of orientations (SHOT) feature, and a point feature histograms (PFH) feature are exemplary examples of the three-dimensional feature amount. For example, the normal feature of a certain point (point of interest) included in the point group can be obtained by obtaining an eigenvector related to a minimum eigenvalue of a covariance matrix of the point group around the point of interest. The loading/unloading target-specifying unit 1704 groups the point group data for each surface of the dump body 210 based on the feature amount. Specifically, the loading/unloading target-specifying unit 1704 divides the point group data into a group corresponding to a front panel, a group corresponding to a side gate, a group corresponding to a tailgate, and a group corresponding to a bottom surface, based on the feature amount. The division method of the point group data described here is an example, and the point group data may be divided into groups other than the above four groups. For example, in another embodiment, there is a high possibility that the loading/unloading target is hidden. Therefore, the loading/unloading target-specifying unit 1704 may not perform the grouping into the group corresponding to the bottom surface. The loading/unloading target-specifying unit 1704 is an example of a dump body surface-specifying unit.

The model-fitting unit 1705 disposes the target model D in a virtual space represented by the site coordinate system based on the position of the point group data grouped for each surface to specify a position, azimuth direction, and inclination of the dump body 210 in the site coordinate system. For example, the model-fitting unit 1705 disposes the target model D such that a typical normal feature of the group of the point group data and the normal feature of each surface of the dump body 210 match within a predetermined error range. The model-fitting unit 1705 according to another embodiment may specify the position of each surface in the vehicle body coordinate system or a camera coordinate system. The model-fitting unit 1705 is an example of a posture-specifying unit. The model-fitting unit 1705 is an example of a posture-specifying unit.

The work equipment position-specifying unit 1706 specifies positions of the boom 111, the arm 112, and the bucket 113 in the site coordinate system based on the angle of the work equipment 110 and the position, azimuth direction, and inclination of the swing body 120 acquired by the data acquisition unit 1701.

The guidance information generation unit 1707 generates the guidance information indicating the positional relationship between the dump body 210 and the bucket 113 based on the position of the dump body 210 specified by the model-fitting unit 1705, the positions of the boom 111, the arm 112, and the bucket 113 specified by the work equipment position-specifying unit 1706, and the position, azimuth direction, and inclination of the swing body 120 acquired by the data acquisition unit 1701.

Figure 6:
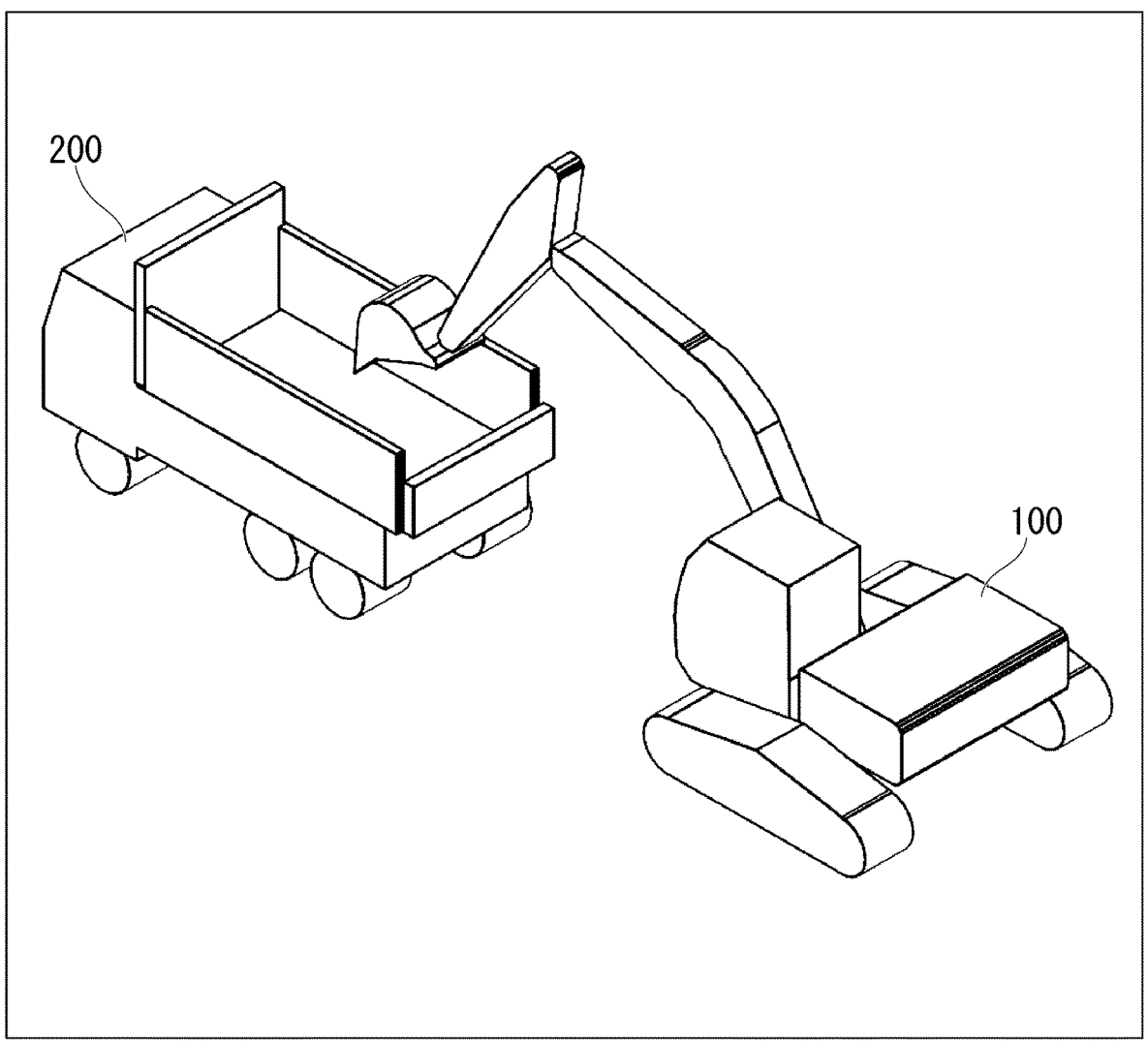
FIG. 6 is an example of guidance information.

FIG. 6 is an example of the guidance information. For example, as shown in FIG. 6, the guidance information generation unit 1707 disposes the three-dimensional model of the hydraulic excavator 100 in the virtual space based on the positions of the boom 111, the arm 112, and the bucket 113 specified by the work equipment position-specifying unit 1706 and the position, azimuth direction, and inclination of the swing body 120. The guidance information generation unit 1707 disposes the three-dimensional model of the hydraulic excavator 100 such that a difference between the three-dimensional feature amount of the three-dimensional model of the dump truck 200 and the three-dimensional feature amount of the dump body 210 specified by the model-fitting unit 1705 is minimized. The guidance information generation unit 1707 renders the hydraulic excavator 100 and the dump truck 200 disposed in the virtual space from a random viewpoint to generate the guidance information representing the positional relationship between the bucket 113 of the hydraulic excavator 100 and the dump body 210 of the dump truck 200.

The guidance information according to another embodiment may not graphically draw the positional relationship between the bucket 113 and the dump body 210. For example, the guidance information according to another embodiment may be information indicating whether or not the bucket 113 is located in the outer frame of the dump body 210 in plan view from above. The guidance information according to another embodiment may be the display of a target excavation position of the bucket 113 or the guidance information for the excavation position of the bucket 113 (for example, information or display indicating a difference between a current position of the bucket 113 and the target excavation position). The guidance information may be information or display indicating how much operation is required to reach the target excavation position. At least only the dump body 210 and the bucket 113 may be displayed.

The display control unit 1708 outputs a display signal for displaying the guidance information to the display device 128.

The learning unit 1709 performs learning processing of the segmentation model M. The learning unit 1709 may be provided in a device separate from the control device 127. In this case, the learned model learned in the separate device is recorded in the storage 93.

<<Display Method>>

Figure 7:
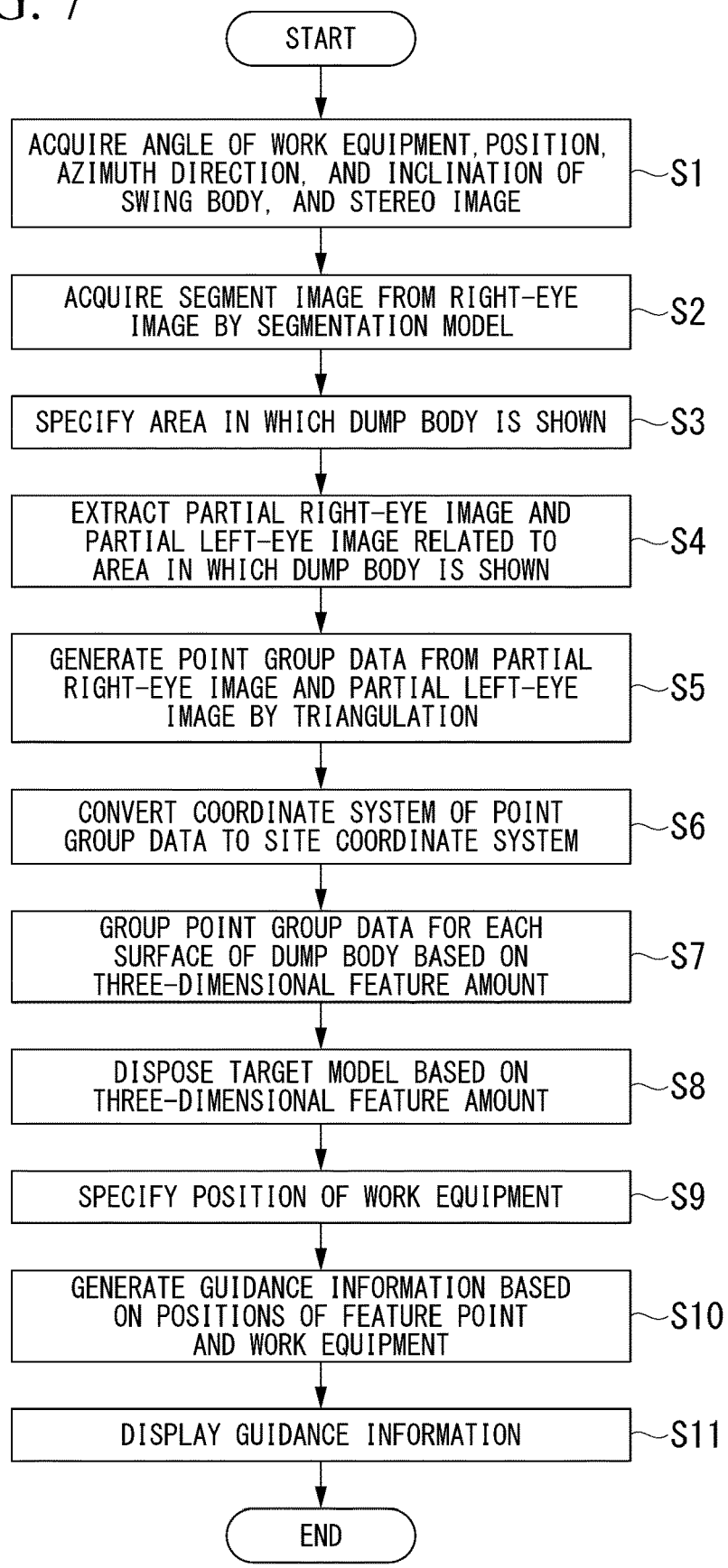
FIG. 7 is a flowchart showing a display method of the guidance information by the control device according to the first embodiment.

FIG. 7 is a flowchart showing a display method of the guidance information by the control device according to the first embodiment.

First, the data acquisition unit 1701 acquires the angle of the work equipment 110 from the work equipment position detector 122 through the interface 94, acquires the position and azimuth direction of the swing body 120 from the position azimuth direction calculator 123, acquires the inclination of the swing body 120 from the inclination detector 124, and acquires the stereo image from the stereo camera 125 (step S1). In another embodiment, the data acquisition unit 1701 may not acquire the angle of the work equipment 110, and the position, azimuth direction, and inclination of the swing body 120. Next, the area-specifying unit 1702 inputs the right-eye image of the stereo image acquired by the data acquisition unit 1701 into the segmentation model M stored in the storage 93 to obtain the segment image divided into the plurality of areas for each shown object (step S2). In another embodiment, the area-specifying unit 1702 may obtain the segment image from the left-eye image.

The area-specifying unit 1702 specifies an area in which the dump body is shown in the stereo image acquired by the data acquisition unit 1701 based on the segment image (step S3).

The three-dimensional data generation unit 1703 extracts the partial right-eye image and the partial left-eye image related to the area, specified in step S3, in which the dump body 210 is shown from each of the right-eye image and the left-eye image of the stereo image (step S4). The three-dimensional data generation unit 1703 generates the point group data related to the vehicle body coordinate system by triangulation based on the partial right-eye image, the partial left-eye image, and the camera parameter CP (step S5). Next, the three-dimensional data generation unit 1703 converts the position of each point of the point group data in the vehicle body coordinate system to the position of each point thereof in the site coordinate system based on the position, azimuth direction, and inclination of the swing body 120 acquired in step S1 (step S6). That is, the three-dimensional data generation unit 1703 moves the point group data in parallel based on the position of the swing body 120 acquired in step S1 and rotates the point group data based on the azimuth direction, and inclination thereof. The coordinate conversion from the vehicle body coordinate system to the site coordinate system may be performed after step S7 or step S8, which will be described below.

The loading/unloading target-specifying unit 1704 specifies the three-dimensional feature amount for each point of the point group data obtained in step S6, and groups the point group data for each surface of the dump body 210 based on the three-dimensional feature amount (step S7). Accordingly, the loading/unloading target-specifying unit 1704 can specify each surface of the dump body 210 from the point group data.

The model-fitting unit 1705 disposes the target model D in the virtual space represented by the site coordinate system such that a difference between a three-dimensional feature amount of the point group data related to each group and a three-dimensional feature amount of the target model D stored in the storage 93 is minimized to specify the position, azimuth direction, and inclination of the dump body 210 in the site coordinate system (step S8). With the disposition of the target model D in the virtual space based on the point group data by the model-fitting unit 1705, it is possible to estimate a hidden portion of the dump body 210 even in a case where a part of the dump body 210 or the like is hidden by an obstacle in the stereo image and then it is possible to improve the recognition accuracy of the dump body 210. In another embodiment, the model-fitting unit 1705 may fit a certain surface grouped in step S7 or a specific point of the surface with a corresponding surface or a specific point of the target model D to dispose the target model D in the site coordinate system. The control device 127 can specify a position, azimuth direction, and inclination of the dump body 210 from each surface specified in step S7 without performing the fitting with the target model D. For example, the control device 127 can specify the position of the dump body 210 from positions of the centers of gravity of the plurality of specified surfaces, specify the azimuth direction of the dump body from a normal direction of the surface corresponding to the front panel or the tailgate, and further specify the inclination of the dump body from the normal direction of the bottom surface of the dump body 210. On the other hand, it is not always possible to accurately extract each surface in the point group data. Therefore, the control device 127 performs the fitting with the target model D and it is possible to further improve the robustness in specifying the position, azimuth direction, and inclination of the dump body 210.

The work equipment position-specifying unit 1706 specifies the positions of the boom 111, the arm 112, and the bucket 113 in the site coordinate system based on the angle of the work equipment 110 and the position, azimuth direction, and inclination of the swing body 120 acquired by the data acquisition unit 1701 (step S9).

The guidance information generation unit 1707 generates the guidance information shown in FIG. 6 based on the position, azimuth direction, and inclination of the dump body 210 specified in step S8, the positions of the boom 111, the arm 112, and the bucket 113 specified in step S9, and the position, azimuth direction, and inclination of the swing body 120 acquired in step S1 (step S10). The display control unit 1708 outputs the display signal for displaying the guidance information to the display device 128 (step S11).

<<Learning Method>>

Figure 8:
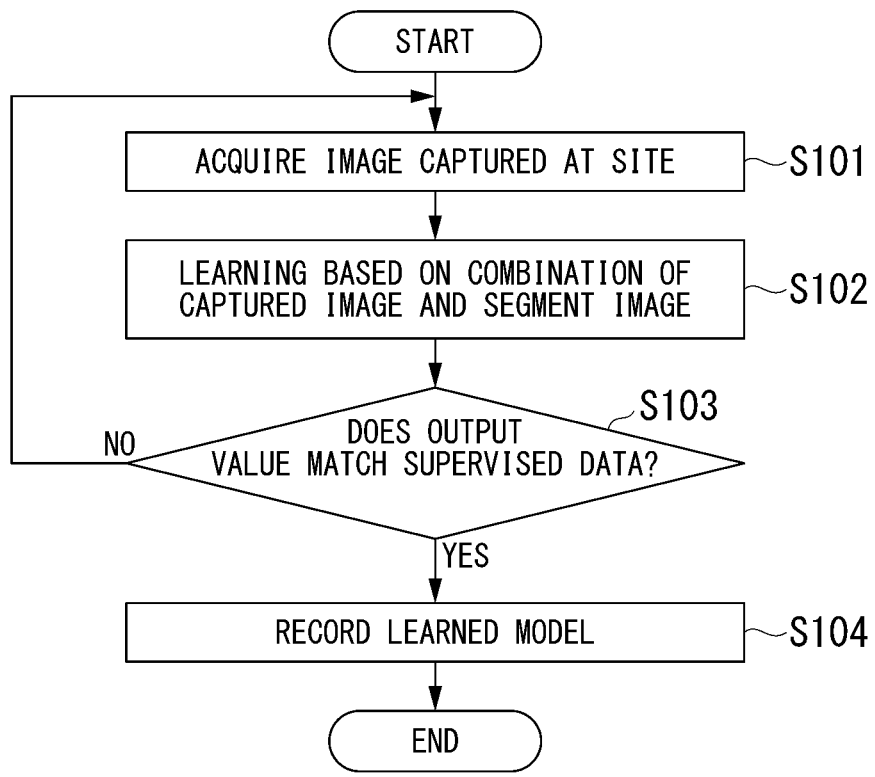
FIG. 8 is a flowchart showing a learning method of a segmentation model according to the first embodiment.

FIG. 8 is a flowchart showing a learning method of the segmentation model according to the first embodiment. The data acquisition unit 1701 acquires the learning data (step S101). For example, the learning data in the segmentation model M is an image captured at the loading site or an image generated from 3DCG or CAD data. A plurality of learning data used for the learning of the segmentation model M include at least an image showing the dump body 210. The learning data may be acquired from the image captured by the stereo camera 125. The learning data may be acquired from an image captured by another work machine.

Next, the learning unit 1709 performs the learning of the segmentation model M. The learning unit 1709 uses the combination of the learning data acquired in step S101 and the supervised data which is the segment image divided into the plurality of areas corresponding to the objects shown in the image related to the learning data as the data set for learning to perform the learning of the segmentation model M (step S102). For example, the learning unit 1709 uses the learning data as an input to perform calculation processing of the neural network 140 in a forward propagation direction. Accordingly, the learning unit 1709 obtains the output value output from the output layer 143 of the neural network 140. The data set for learning may be stored in the main memory 92 or the storage 93. Next, the learning unit 1709 calculates an error between the output value from the output layer 143 and the supervised data. The learning unit 1709 updates the weight of the coupling between the neurons based on the error of the calculated output value.

The learning unit 1709 inputs the learning data related to an evaluation data set to the segmentation model M to determine whether or not the output value from the segmentation model M matches the supervised data related to the evaluation data set, using the data set for learning that has not been used for the learning of the segmentation model M as the evaluation data set (step S103). When the number of pixels in which the output value and the supervised data are different is within a predetermined number, it may be determined that the output value and the supervised data match. In a case where the output value from the segmentation model M does not match the supervised data (step S103: NO), the above processing is repeated until the output value from the segmentation model M matches the supervised data. As a result, a parameter of the segmentation model M is optimized, and the segmentation model M can be learned.

In a case where the output value from the segmentation model M matches the supervised data (step S103: YES), the learning unit 1709 records the segmentation model M which is a learned model including the parameter optimized by the learning in the storage 93 (step S104).

Action/Effect

As described above, according to the first embodiment, the control device 127 specifies the area in which the dump body 210 is shown and specifies the position of the dump body 210 based on the area, from the captured image showing the dump body 210 which is the loading/unloading target of the transporting material L. As described above, the control device 127 according to the first embodiment can specify the position of the loading/unloading target regardless of an edge included in the image. Accordingly, the control device 127 according to the first embodiment can improve the robustness of the processing of specifying the position of the loading/unloading target of the transporting material L even in a case where it is difficult to detect the edge due to the distortion of the loading/unloading target or the like. When the transporting material L is loaded into the dump body 210, a surface shape of the dump body 210 as a whole is changed. However, the transporting material L and the dump body 210 can be identified by specifying the area in which the dump body 210 is shown. Therefore, it is possible to improve the robustness of recognition. Depending on the embodiment, the processing of steps S2 to S6 and steps S8 to S11 among the processing by the control device 127 shown in FIG. 7 may not be performed.

The control device 127 according to the first embodiment displays the guidance information. Accordingly, even in a case where it is difficult for the operator to visually recognize the dump body 210 due to a relative position between the hydraulic excavator 100 and the dump truck 200, the control device 127 allows the operator to recognize the loading/unloading target. It is possible to improve the work efficiency by operating the work equipment 110 using the dump body 210 displayed as the guidance information as a guide.

According to the first embodiment, the control device 127 specifies the area in which the loading/unloading target is shown in the captured image based on the segmentation model M and the captured image. It is known that the segmentation, which is the segmentation of objects included in an image, can be accurately realized with the learned model related to machine learning. Therefore, according to the first embodiment, the control device 127 can accurately specify a position of a predetermined portion of the dump body 210 by recognizing the dump body 210 using the segmentation model M. The present invention is not limited thereto in another embodiment. The control device 127 may perform the segmentation of the objects shown in the image by a method other than the machine learning technique.

According to the first embodiment, the control device 127 generates the point group data using the partial right-eye image and the partial left-eye image related to the specified area. Accordingly, it is possible to reduce an amount of calculation as compared with the case where the point group data is generated using all the pixels of the stereo image. Since the extra areas other than the area specified by the segmentation (for example, areas such as the transporting material L, the work equipment 110, and the ground) are omitted, the loading/unloading target-specifying unit 1704 can reduce a possibility of noise being mixed in the group of the point group data. The control device 127 according to another embodiment may generate the point group data using all the pixels of the stereo image and extract a portion related to a specified area from the point group data.

In another embodiment, the three-dimensional data may be generated by using a distant image generated by a laser scanner instead of the stereo image.

The control device 127 according to the first embodiment generates the point group data from the captured image and disposes the point group data in the site coordinate system based on the position, azimuth direction, and inclination of the swing body 120. Accordingly, it is possible to specify the position, azimuth direction, and inclination of the dump body 210 in the site coordinate system even in a case where a position, azimuth direction, and inclination of the stereo camera 125 are changed by the operation of the hydraulic excavator 100. In another embodiment, in a case where the stereo camera 125 is fixedly installed at the construction site, the point group data may be disposed in the site coordinate system without obtaining the position, azimuth direction, and inclination of the swing body 120.

Second Embodiment

Hereinafter, a second embodiment will be described with reference to drawings. The control device 127 according to the first embodiment generates the guidance information based on the specified position, azimuth direction, and inclination of the dump body 210 and presents the guidance information to the operator. On the contrary, the control device 127 according to the second embodiment controls the loading work of the work equipment based on the specified position, azimuth direction, and inclination of the dump body 210.

<<Configuration of Control Device>>

Figure 9:
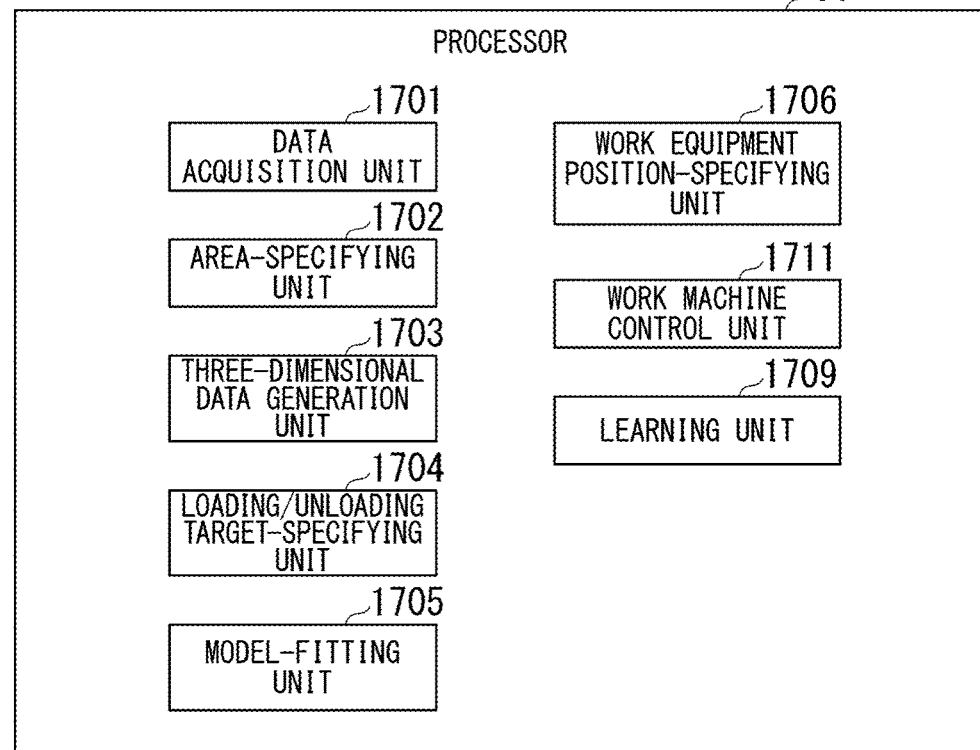
FIG. 9 is a schematic block diagram showing a configuration of a control device according to a second embodiment.
Figure 9:
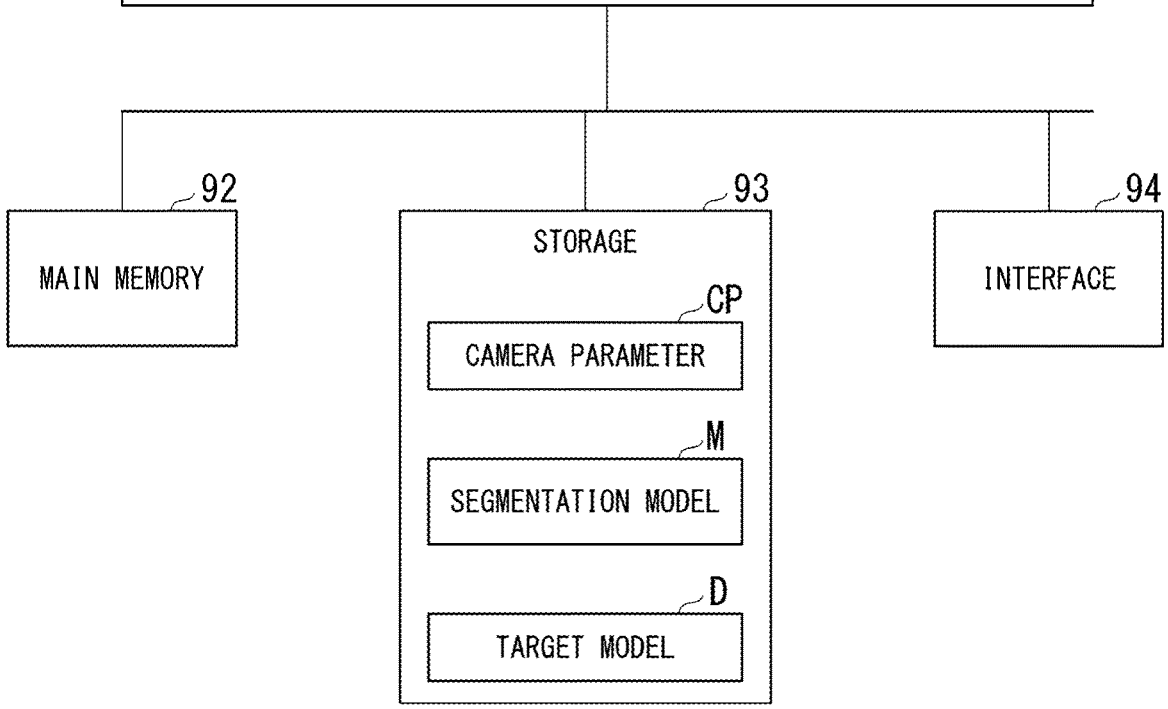

FIG. 9 is a schematic block diagram showing a configuration of a control device according to the second embodiment.

The processor 91 according to the second embodiment includes a work machine control unit 1711 instead of the guidance information generation unit 1707 and the display control unit 1708 according to the first embodiment.

The work machine control unit 1711 controls behavior of the swing body 120 and the work equipment 110 based on the position, azimuth direction, and inclination of the dump body 210 specified by the model-fitting unit 1705 in a case where an automatic loading button provided on the operation device 126 is pressed by the operator.

<<Control Method of Hydraulic Excavator>>

Figure 10:
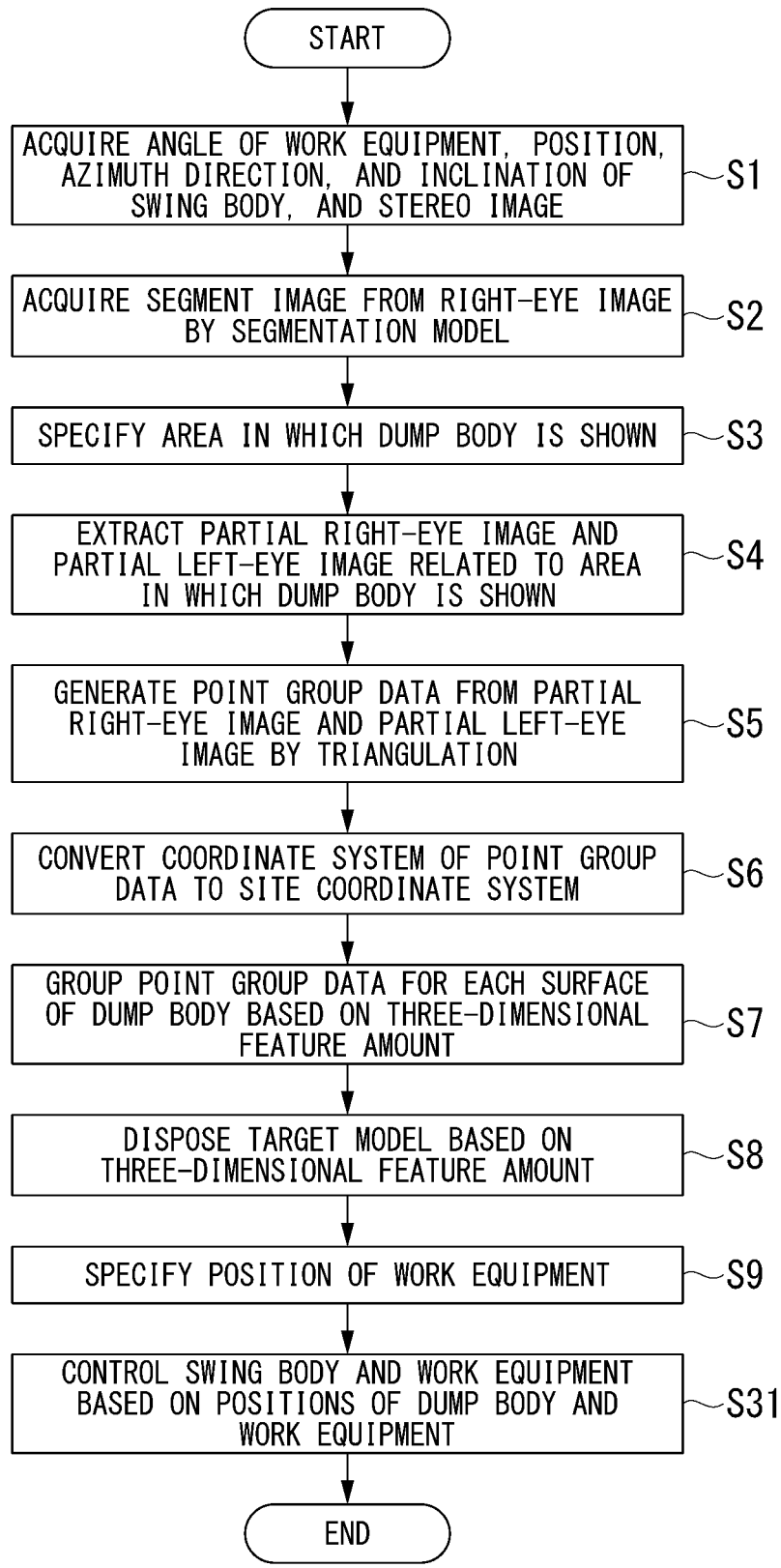
FIG. 10 is a flowchart showing a control method of a hydraulic excavator according to the second embodiment.

FIG. 10 is a flowchart showing a control method of a hydraulic excavator according to the second embodiment.

When the automatic loading button is pressed, the control device 127 specifies the positions of the dump body 210 and the work equipment 110 in the site coordinate system by the same processing as in steps S1 to S9 of the first embodiment. The work machine control unit 1711 generates and outputs control signals for the swing body 120 and the work equipment 110 based on the positions of the dump body 210 and the work equipment 110 in the site coordinate system (step S31).

For example, in a case where a height of the bucket 113 is lower than a height of the dump body 210, the work machine control unit 1711 generates the control signal for raising the boom 111. In a case where the height of the bucket 113 is equal to or higher than the height of the dump body 210, the work machine control unit 1711 stops the output of the control signal for raising the boom 111 and starts the output of the control signal for swing the swing body 120. In a case where the height of the bucket 113 is equal to or higher than the height of the dump body 210 and a position of the bucket 113 when viewed in plan view from above is within a range of the dump body 210 specified from the position of the dump body 210, the work machine control unit 1711 stops the output of the control signal for swing the swing body 120 and generates the control signal for dumping the bucket 113.

Action/Effect

As described above, according to the second embodiment, the control device 127 can automatically control the hydraulic excavator 100 based on the captured image.

Third Embodiment

Hereinafter, a third embodiment will be described with reference to drawings. The control device 127 according to the third embodiment causes the display device 128 to display a dump body map indicating a distribution of an amount of the transporting material L in the dump body 210. Accordingly, the control device 127 causes the operator to recognize the loading/unloading position of the transporting material L for loading the transporting material L into the dump body 210 in a well-balanced manner.

Figure 11:
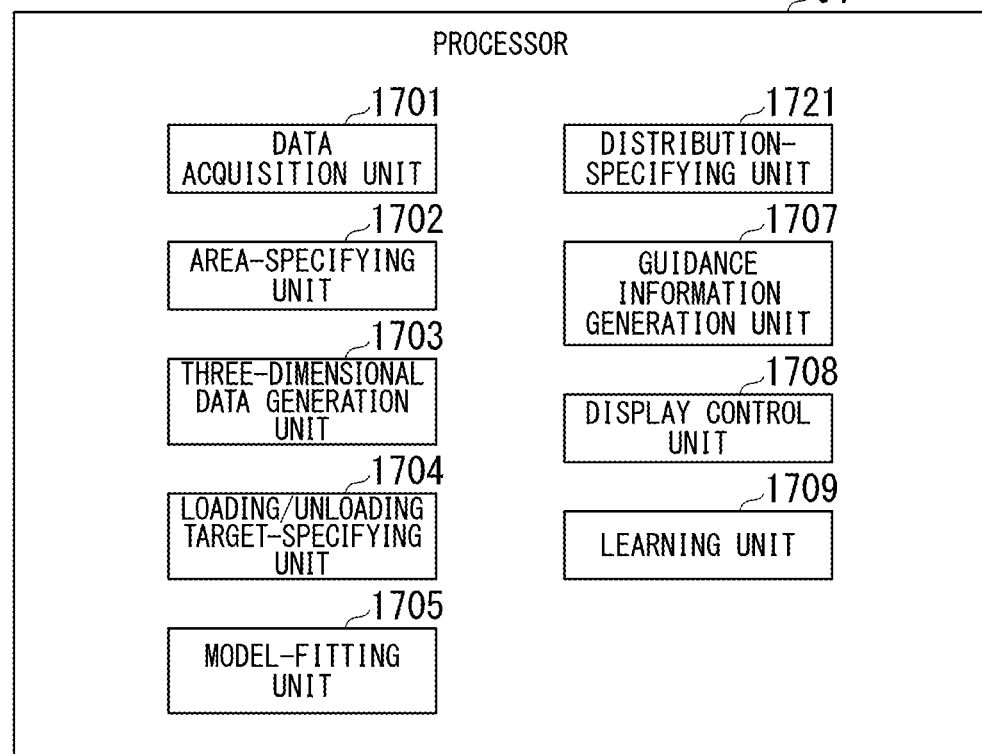
FIG. 11 is a schematic block diagram showing a configuration of a control device according to a third embodiment.

FIG. 11 is a schematic block diagram showing a configuration of a control device according to the third embodiment.

The control device 127 according to the third embodiment includes a distribution-specifying unit 1721 instead of the work equipment position-specifying unit 1706 according to the first embodiment. The area-specifying unit 1702, the three-dimensional data generation unit 1703, and the guidance information generation unit 1707 according to the third embodiment have different processing from that of the first embodiment.

The area-specifying unit 1702 specifies an area in which the transporting material L is shown in addition to the area in which the dump body 210 is shown in the stereo image. The three-dimensional data generation unit 1703 generates dump body point group data, which is three-dimensional data related to the area in which the dump body 210 is shown, and transporting material point group data, which is three-dimensional data related to the area in which the transporting material L is shown. The three-dimensional data generation unit 1703 may generate the transporting material point group data not only from the area classified into the transporting material L but also from the area including the vicinity of the area classified into the transporting material L. For example, the three-dimensional data generation unit 1703 may generate the transporting material point group data based on the area in which the rectangle circumscribing the area classified into the transporting material L is expanded vertically and horizontally by a predetermined number of pixels. By extracting the area including the vicinity of the area classified as the transporting material L, it is possible to prevent the area in which the transporting material L is shown from being missing even in a case where a part of the transporting material L is classified as another object due to a segmentation error.

The distribution-specifying unit 1721 generates the dump body map indicating the distribution of the amount of the transporting material L in the dump body 210 based on a three-dimensional position of the bottom surface of the dump body 210 specified by the model-fitting unit 1705 and the transporting material point group data generated by the three-dimensional data generation unit 1703. The dump body map is, for example, an elevation map of the transporting material L with reference to the bottom surface of the dump body 210.

The guidance information generation unit 1707 generates the guidance information from the dump body map generated by the distribution-specifying unit 1721.

Figure 12:
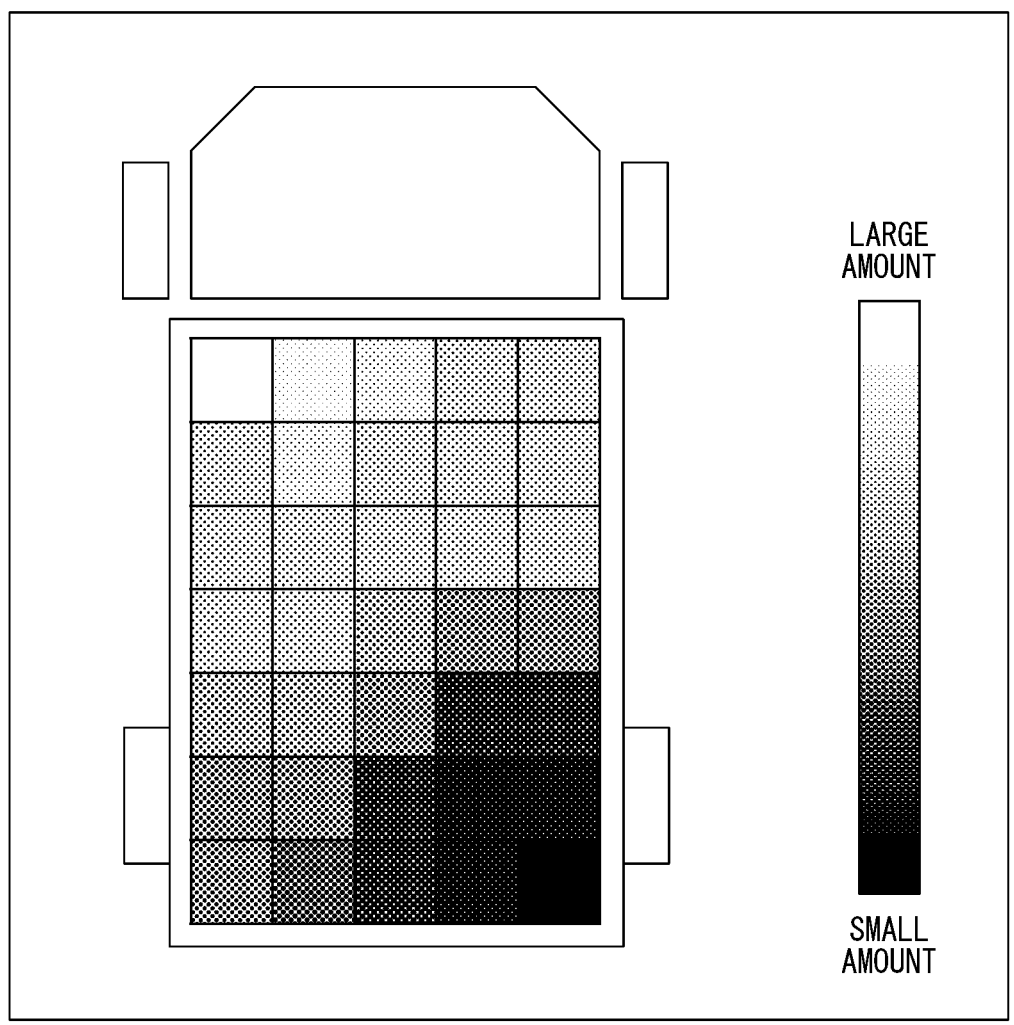
FIG. 12 is an example of guidance information according to the third embodiment.

FIG. 12 is an example of guidance information according to the third embodiment. For example, as shown in FIG. 12, the guidance information generation unit 1707 generates the guidance information for displaying a two-dimensional heat map representing a distribution of a height from the bottom surface of the dump body 210 to the surface of the transporting material L. Granularity of vertical and horizontal divisions in the heat map shown in FIG. 12 is an example and is not limited thereto in another embodiment. The heat map according to another embodiment may represent, for example, a ratio of a height of the transporting material L to a height related to an upper limit of the loading of the dump body 210.

<<Display Method>>

Figure 13:
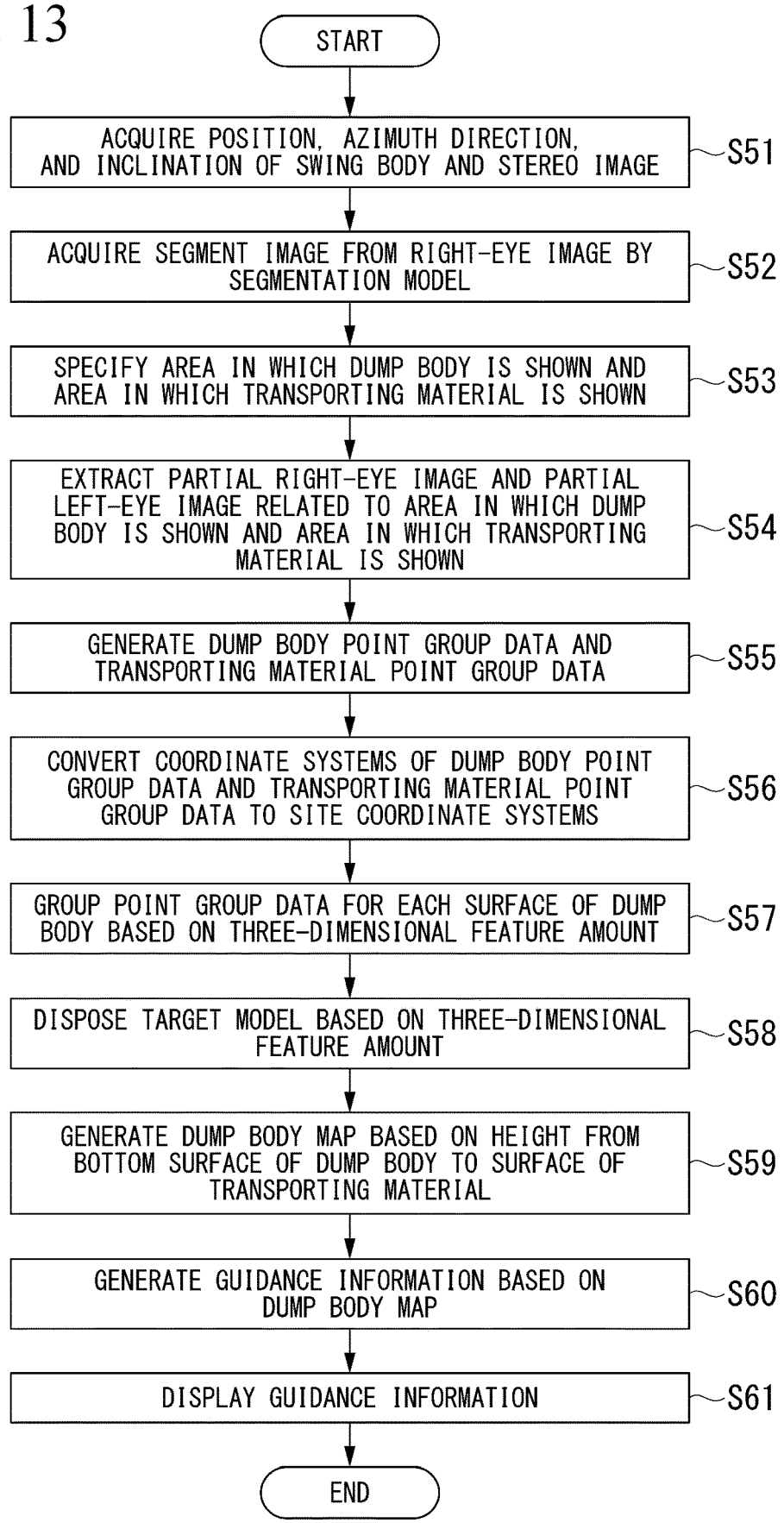
FIG. 13 is a flowchart showing a display method of guidance information by the control device according to the third embodiment.

FIG. 13 is a flowchart showing a display method of the guidance information by the control device according to the third embodiment.

First, the data acquisition unit 1701 acquires the position and azimuth direction of the swing body 120 from the position azimuth direction calculator 123 through the interface 94, acquires the inclination of the swing body 120 from the inclination detector 124, and acquires the stereo image from the stereo camera 125 (step S51). In another embodiment, the data acquisition unit 1701 may not acquire the angle of the work equipment 110, and the position, azimuth direction, and inclination of the swing body 120. Next, the area-specifying unit 1702 inputs the stereo image acquired by the data acquisition unit 1701 into the segmentation model M stored in the storage 93 to obtain the segment image divided into the plurality of areas for each shown object (step S52). The area-specifying unit 1702 specifies the area in which the dump body 210 is shown and the area in which the transporting material L is shown in the stereo image acquired by the data acquisition unit 1701, based on the segment image (step S53).

The three-dimensional data generation unit 1703 extracts the partial right-eye image and the partial left-eye image related to the area, specified in step S3, in which the dump body 210 is shown, and the partial right-eye image and the partial left-eye image related to the area in which the transporting material L is shown, from each of the right-eye image and the left-eye image of the stereo image (step S54). The three-dimensional data generation unit 1703 generates the dump body point group data related to the vehicle body coordinate system by triangulation based on the partial right-eye image and the partial left-eye image related to the area in which the dump body 210 is shown and the camera parameter CP. The three-dimensional data generation unit 1703 generates the transporting material point group data related to the vehicle body coordinate system by triangulation based on the partial right-eye image and the partial left-eye image related to the area in which the transporting material L is shown and the camera parameter CP (step S55). The three-dimensional data generation unit 1703 converts the position of each point of the dump body point group data and the transporting material point group data in the vehicle body coordinate system to the position of each point thereof in the site coordinate system, based on the position, azimuth direction, and inclination of the swing body 120 (step S56).

The loading/unloading target-specifying unit 1704 specifies the three-dimensional feature amount for each point of the dump body point group data obtained in step S56 and groups the dump body point group data for each surface of the dump body 210 based on the three-dimensional feature amount (step S57). The model-fitting unit 1705 disposes the target model D in the virtual space represented by the site coordinate system such that a difference between a three-dimensional feature amount of the dump body point group data related to each group and the three-dimensional feature amount of the target model D stored in the storage 93 is minimized to specify the position, azimuth direction, and inclination of the dump body 210 in the site coordinate system (step S58).

The distribution-specifying unit 1721 generates the dump body map which is the elevation map representing a height related to the vertically upward direction with reference to the bottom surface of the dump body 210 based on the transporting material point group data generated in step S55 and the target model D disposed in step S58 (step S59). The dump body map may include a grid without the height data. In a case where the point group data is converted to the dump body coordinate system in step S5, the distribution-specifying unit 1721 can generate the dump body map by obtaining the elevation map with an XY plane as the reference height and with the Z-axis direction as the height direction.

The guidance information generation unit 1707 generates the guidance information shown in FIG. 12 based on the dump body map (step S60). The display control unit 1708 outputs the display signal for displaying the guidance information to the display device 128 (step S61).

Action/Effect

As described above, according to the third embodiment, the control device 127 specifies the three-dimensional positions of the surface of the transporting material L and the bottom surface of the dump body 210 based on the captured image to generate the dump body map indicating the distribution of the amount of the transporting material L in the dump body 210 based on the three-dimensional positions. Accordingly, the control device 127 can specify the distribution of the transporting material L in the dump body 210. The operator can recognize the loading/unloading position of the transporting material L for loading the transporting material L in the dump body 210 in a well-balanced manner by recognizing the distribution of the transporting material L in the dump body 210.

In the third embodiment, the control device 127 generates the guidance information based on the dump body map, but the present invention is not limited thereto. For example, in another embodiment, the control device 127 may control the hydraulic excavator 100 as in the second embodiment based on the dump body map. For example, in a case where the height of the bucket 113 is lower than the height of the dump body 210 or a height of a peak of the distribution of the transporting material L in the dump body map, the work machine control unit 1711 generates the control signal for raising the boom 111. In a case where the height of the bucket 113 is equal to or higher than the height of the dump body 210 and the height of the peak of the distribution of the transporting material L in the dump body map, the work machine control unit 1711 stops the output of the control signal for raising the boom 111 and starts the output of the control signal for swing the swing body 120. In a case where the height of the bucket 113 is equal to or higher than the height of the dump body 210 and the height of the peak of the distribution of the transporting material L in the dump body map and the position of the bucket 113 when viewed in plan view from above is within the range of the dump body 210 specified from the position of the dump body 210, the work machine control unit 1711 stops the output of the control signal for swing the swing body 120 and generates the control signal for dumping the bucket 113.

Fourth Embodiment

The control device 127 according to the third embodiment matches the target model D with the dump body point group data to specify the three-dimensional position of the bottom surface of the dump body 210. On the contrary, the control device 127 according to the fourth embodiment specifies the three-dimensional position of the bottom surface of the dump body 210 without using the target model D. That is, the control device 127 according to the fourth embodiment may not store the target model D in the storage 93.

The model-fitting unit 1705 according to the fourth embodiment distorts a rectangular parallelepiped polygon without a top surface to best match the dump body point group data based on the dump body point group data. The model-fitting unit 1705 specifies a position of a bottom surface of the matched rectangular parallelepiped polygon as the position of the bottom surface of the dump body 210.

As described above, according to the fourth embodiment, it is possible to specify the position of the bottom surface of the dump body 210 without using the target model D of the dump body 210. According to the fourth embodiment, it is possible to specify the position of the bottom surface of the dump body 210 even though the dump body point group data contains noise.

Fifth Embodiment

Figure 14:
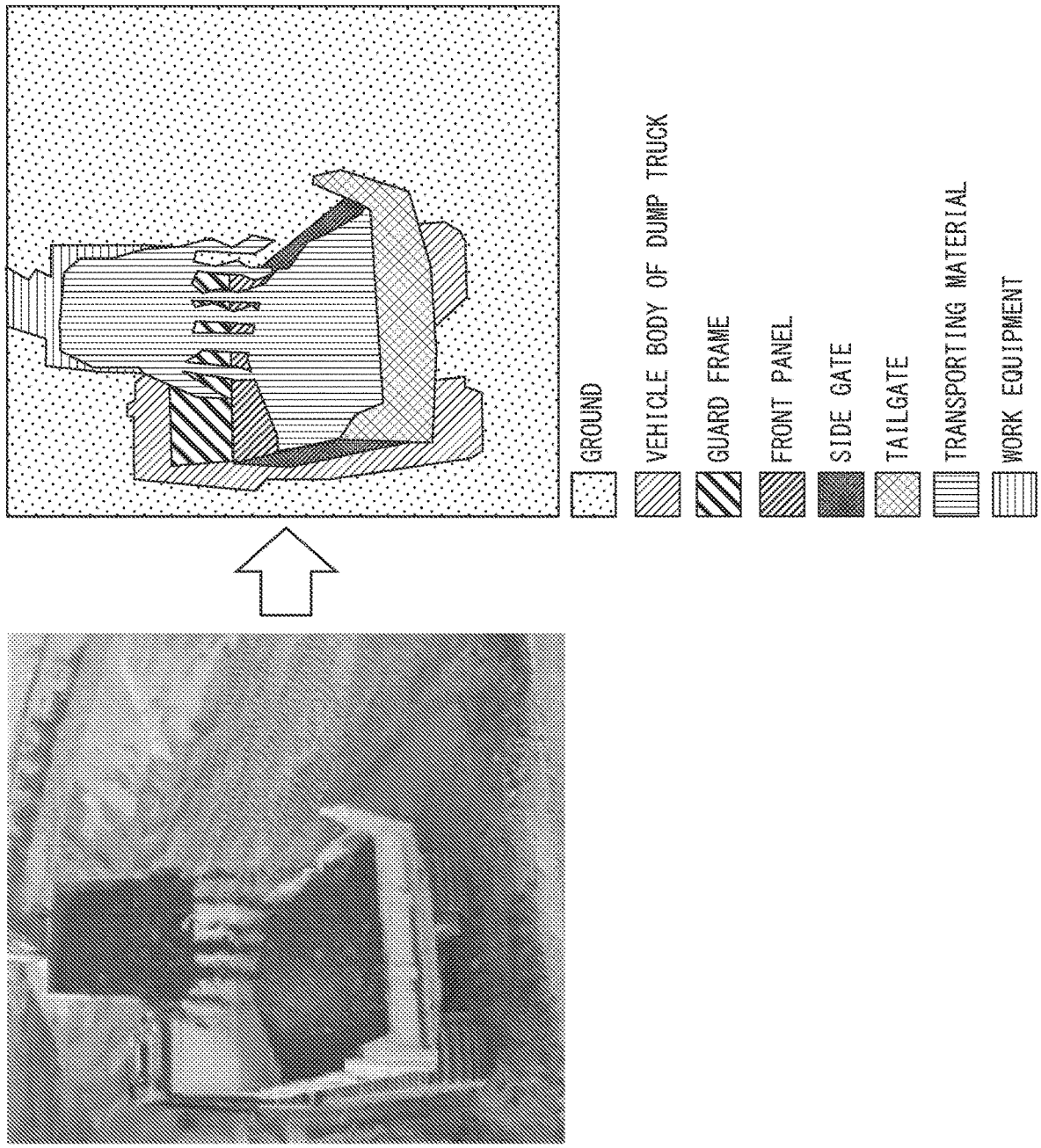
FIG. 14 is a diagram showing an example of image segmentation according to a fifth embodiment.

FIG. 14 is a diagram showing an example of image segmentation according to a fifth embodiment.

In the segment image generated by the segmentation model M according to the first to fourth embodiments, the area in which the dump body 210 is shown is represented by one segment. The segmentation model M trained to generate the segment image in which the image showing the dump body 210 is divided into an area in which the guard frame is shown, an area in which the front panel is shown, an area in which the side gate is shown, and an area in which the tailgate is shown, as shown in FIG. 14, is used as the segmentation model M according to the fifth embodiment.

The control device 127 according to the fifth embodiment may not include the loading/unloading target-specifying unit 1704 in the configuration of the first embodiment. On the other hand, the operations of the area-specifying unit 1702, the three-dimensional data generation unit 1703, and the model-fitting unit 1705 of the control device 127 according to the fifth embodiment are different.

The area-specifying unit 1702 inputs the right-eye image of the stereo image acquired by the data acquisition unit 1701 into the segmentation model M stored in the storage 93 to divide the right-eye image into the plurality of areas corresponding to the plurality of known objects. In this case, the plurality of known objects include at least the guard frame, the front panel, the side gate, and the tailgate.

The three-dimensional data generation unit 1703 generates the point group data related to each area of the guard frame, the front panel, the side gate, and the tailgate from the stereo image.

The model-fitting unit 1705 disposes the target model D in the virtual space represented by the site coordinate system based on the position of each piece of point group data of the guard frame, the front panel, the side gate, and the tailgate to specify the position, azimuth direction, and inclination of the dump body 210 in the site coordinate system.

<<Display Method>>

Figure 15:
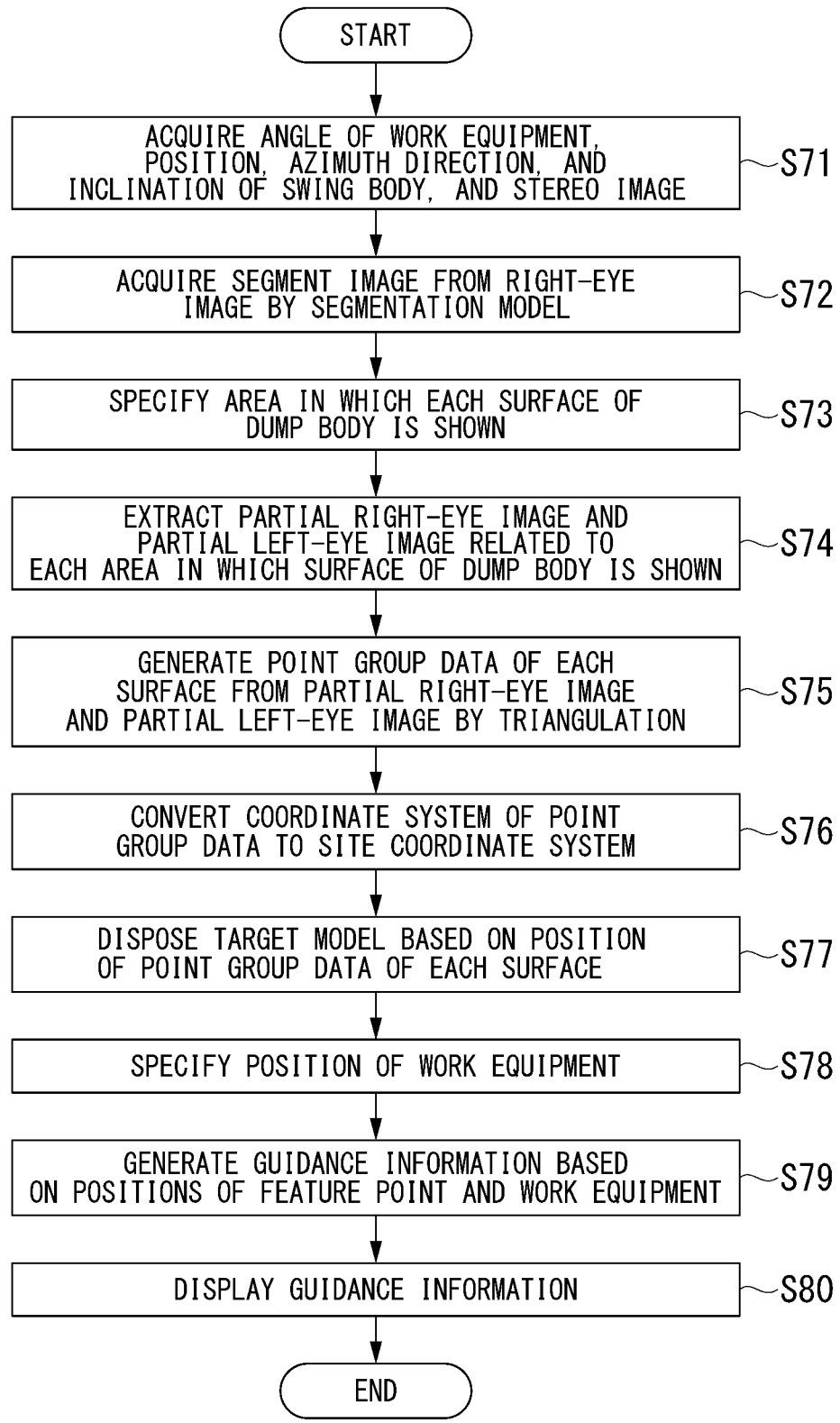
FIG. 15 is a flowchart showing a display method of guidance information by a control device according to the fifth embodiment.

FIG. 15 is a flowchart showing a display method of the guidance information by a control device according to the fifth embodiment.

First, the data acquisition unit 1701 acquires the angle of the work equipment 110 from the work equipment position detector 122 through the interface 94, acquires the position and azimuth direction of the swing body 120 from the position azimuth direction calculator 123, acquires the inclination of the swing body 120 from the inclination detector 124, and acquires the stereo image from the stereo camera 125 (step S71). In another embodiment, the data acquisition unit 1701 may not acquire the angle of the work equipment 110, and the position, azimuth direction, and inclination of the swing body 120. Next, the area-specifying unit 1702 inputs the stereo image acquired by the data acquisition unit 1701 into the segmentation model M stored in the storage 93 to obtain the segment image divided into the plurality of areas for each shown object (step S72). The area-specifying unit 1702 specifies the area for each surface of the dump body 210 in the stereo image acquired by the data acquisition unit 1701 based on the segment image (step S73). That is, the area-specifying unit 1702 specifies each of the area in which the guard frame is shown, the area in which the front panel is shown, the area in which the side gate is shown, and the area in which the tailgate is shown.

The three-dimensional data generation unit 1703 extracts the partial right-eye image and the partial left-eye image related to each surface specified in step S73 from each of the right-eye image and the left-eye image of the stereo image (step S74). The three-dimensional data generation unit 1703 generates the point group data of each surface related to the vehicle body coordinate system by triangulation based on the partial right-eye image, the partial left-eye image, and the camera parameter CP (step S75). Next, the three-dimensional data generation unit 1703 converts the position of each point of the point group data of each surface in the vehicle body coordinate system to the position of each point thereof in the site coordinate system based on the position, azimuth direction, and inclination of the swing body 120 (step S76). In this case, the point group data is already divided into the group for each surface without specifying the three-dimensional feature amount.

The model-fitting unit 1705 disposes the target model D in the virtual space represented by the site coordinate system such that a difference between the position of the point group data related to each group and the position of each surface of the target model D stored in the storage 93 is minimized to specify the position, azimuth direction, and inclination of the dump body 210 in the site coordinate system (step S77).

The work equipment position-specifying unit 1706 specifies the positions of the boom 111, the arm 112, and the bucket 113 in the site coordinate system based on the angle of the work equipment 110 and the position, azimuth direction, and inclination of the swing body 120 acquired by the data acquisition unit 1701 (step S78).

The guidance information generation unit 1707 generates the guidance information based on the position, azimuth direction, and inclination of the dump body 210 specified in step S77, the positions of the boom 111, the arm 112, and the bucket 113 specified in step S78, and the position, azimuth direction, and inclination of the swing body 120 acquired in step S71 (step S79). The display control unit 1708 outputs the display signal for displaying the guidance information to the display device 128 (step S80).

Action/Effect

As described above, according to the fifth embodiment, in the control device 127, the segmentation model M divides each surface of the dump body 210 into the different areas. Accordingly, the control device 127 can match the three-dimensional data with the three-dimensional model without calculating the three-dimensional feature amount.

Another Embodiment

Although one embodiment has been described in detail with reference to the drawings, the specific configuration is not limited to the above, and various design changes and the like can be made.

For example, in the above embodiment, the control device 127 generates the three-dimensional data from the stereo image based on triangulation, but the present invention is not limited thereto. For example, the control device 127 according to another embodiment may generate the three-dimensional data using a learned model that outputs the depth image by inputting the stereo image. In another embodiment, the segmentation model M learned such that the stereo image is input and the depth image divided into areas for each object is output may be employed.

In the above embodiment, the control device 127 specifies the position, azimuth direction, and inclination of the dump body 210, but is not limited thereto in another embodiment. For example, the control device 127 according to another embodiment may specify the position of the dump body 210 and may not specify the azimuth direction, and inclination of the dump body 210. For example, the control device 127 according to another embodiment may specify the position and azimuth direction of the dump body 210 and may not specify the inclination of the dump body 210.

The control device 127 according to the above embodiment is mounted on the hydraulic excavator 100, but the present invention is not limited thereto. For example, the control device 127 according to another embodiment may be provided in a remote server device. The control device 127 may be realized from a plurality of computers. In this case, a part of the configuration of the control device 127 may be provided in the remote server device. That is, the control device 127 may be implemented as an image processing system formed of a plurality of devices. The hydraulic excavator 100 may be a fully autonomous type or a partially autonomous type hydraulic excavator. The display signal for displaying the guidance information may be transmitted to a remote cab for remotely controlling the work machine.

The loading/unloading target according to the above embodiment is the dump body 210 of the dump truck 200, but the present invention is not limited thereto. For example, the loading/unloading target according to another embodiment may be another loading/unloading target such as a hopper.

Further, the operations described using the flowchart in the above embodiment are not limited to those executed in the above order. For example, in the display method of the guidance information shown in FIG. 7, the coordinate system of the point group data is converted to the site coordinate system in step S6, and then the surface grouping in step S7 and the posture specification of the dump body in step S8 are performed. However, the present invention is not limited thereto. For example, in another embodiment, the coordinate conversion may be performed after the surface grouping in step S7 or the posture specification of the dump body in step S8. Similarly, it is possible to change the order of processing as appropriate also for other operations.

In the above embodiment, the control device of the hydraulic excavator 100 specifies the position of the dump body 210, but the present invention is not limited thereto. For example, in another embodiment, a control device of another work machine such as a mobile crane, a control device of a work machine such as a dump truck, a wheel loader, or a bulldozer, or a monitoring device, which is installed in the site, may specify the position of the dump body 210.

INDUSTRIAL APPLICABILITY

According to the disclosure of the present invention, the image processing system can improve the robustness of the processing of specifying the loading/unloading target.

What is claimed is:

1. An image processing system, comprising:
   a processor configured to:
   acquire a captured image showing a dump body of a dump truck, the dump body being configured to accommodate a transporting material and being a loading/unloading target of the transporting material;
   specify an area including the dump body from the captured image;
   specify at least one predetermined surface of the dump body from the specified area;
   generate three-dimensional data related to the area representing a three-dimensional shape of a subject of the captured image; and
   specify a position of the dump body based on (i) the at least one predetermined surface in the three-dimensional data related to the area and (ii) a target model that is a three-dimensional model indicating a shape of the dump body.

2. The image processing system according to claim 1, wherein the processor is configured to specify the area including the dump body based on a segmentation model that is a learned model configured to receive the captured image as an input image and to output an output image, and
   wherein each of a plurality of pixels of the output image has a value representing a type of an object shown in a pixel of the input image corresponding to a pixel of the output image.

3. The image processing system according to claim 1, wherein the processor is further configured to specify an azimuth direction and a posture of the dump body based on the at least one predetermined specified surface.

4. The image processing system according to claim 1, wherein the processor is further configured to:
   acquire an image-capturing posture of an image-capturing device that captures the captured image; and
   specify a three-dimensional position of the dump body at a site based on the area and the image-capturing posture.

5. The image processing system according to claim 1, wherein the processor is further configured to:
   generate transporting material three-dimensional data representing a three-dimensional position of the transporting material loaded in the dump body based on the captured image; and
   generate distribution information indicating a distribution of an amount of the transporting material in the dump body based on the transporting material three-dimensional data in the dump body and a three-dimensional position of at least a part of the dump body.

6. An image processing method, comprising:
acquiring a captured image showing a dump body of a dump truck, the dump body being configured to accommodate a transporting material and being a loading/unloading target of the transporting material;
specifying an area including the dump body from the captured image;
specifying at least one predetermined surface of the dump body from the specified area;
generating three-dimensional data related to the area representing a three-dimensional shape of a subject of the captured image; and
specifying a position of the dump body based on (i) the at least one predetermined surface in the three-dimensional data related to the area and (ii) a target model that is a three-dimensional model indicating a shape of the dump body.

7. The image processing method of claim 6, wherein specifying the area including the dump body is performed based on a segmentation model that is a learned model configured to receive the captured image as an input image and to output an output image, and
wherein each of a plurality of pixels of the output image has a value representing a type of an object shown in a pixel of the input image corresponding to a pixel of the output image.

* * * * *